United States Patent [19]

Ingji et al.

[11] Patent Number: 5,144,209
[45] Date of Patent: Sep. 1, 1992

[54] BRUSHLESS DC MOTOR

[75] Inventors: Toshio Inaji, Minoo; Makoto Gotou, Nishinomiya, both of Japan

[73] Assignee: Matsushita Electric Industrial Co., Ltd., Osaka, Japan

[21] Appl. No.: 722,676

[22] Filed: Jun. 28, 1991

[30] Foreign Application Priority Data

Jul. 4, 1990 [JP] Japan .................... 2-176721
Jul. 4, 1990 [JP] Japan .................... 2-176722
Sep. 17, 1990 [JP] Japan .................... 2-247710

[51] Int. Cl.$^5$ .......................................... H02P 6/02
[52] U.S. Cl. ................................. 318/254; 318/138
[58] Field of Search ..................... 318/138, 254, 439

[56] References Cited

U.S. PATENT DOCUMENTS

| | | | |
|---|---|---|---|
| 4,694,210 | 9/1987 | Elliott et al. | 310/68 R |
| 4,712,050 | 12/1987 | Nagasawa et al. | 318/254 |
| 4,835,448 | 5/1989 | Dishner et al. | 318/254 |
| 4,912,378 | 3/1990 | Vukosavic | 318/254 |
| 4,928,043 | 5/1990 | Plunkett | 318/254 |
| 4,970,445 | 11/1990 | Kimura et al. | 318/254 |
| 4,978,895 | 12/1990 | Schwarz | 318/254 |
| 4,983,894 | 1/1991 | Oku et al. | 318/138 |

FOREIGN PATENT DOCUMENTS 55-160980 12/1980 Japan .
62-260586 11/1987 Japan .

*Primary Examiner*—Bentsu Ro
*Attorney, Agent, or Firm*—Wenderoth, Lind & Ponack

[57] ABSTRACT

A brushless DC motor which does not have a position sensor for detecting a rotational point of a rotor, instead of using a position sensor, detects the zero-crossing points of counter electromotive forces induced in the stator windings of the motor to obtain a pulse signal train. From the pulse signal train thus obtained and a slant waveform signal generated in response to the pulse signal train, a position signal with a trapezoidal waveform is formed. An electric current signal with a trapezoidal waveform is supplied to the stator windings of the motor in response to the position signal thus formed for effecting an electric current switching of the stator windings smoothly, resulting in realizing a motor drive which is less in vibration and noise even when rotating at a high speed.

22 Claims, 13 Drawing Sheets

COUNTER ELECTROMOTIVE FORCE DETECTING CIRCUIT

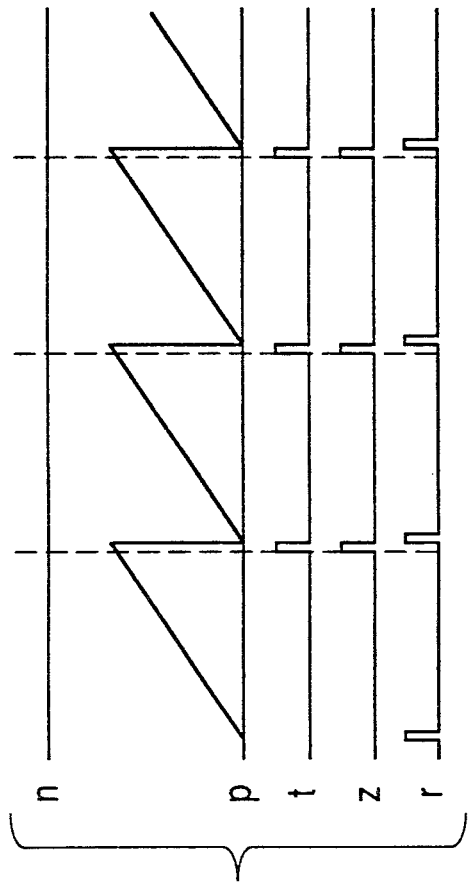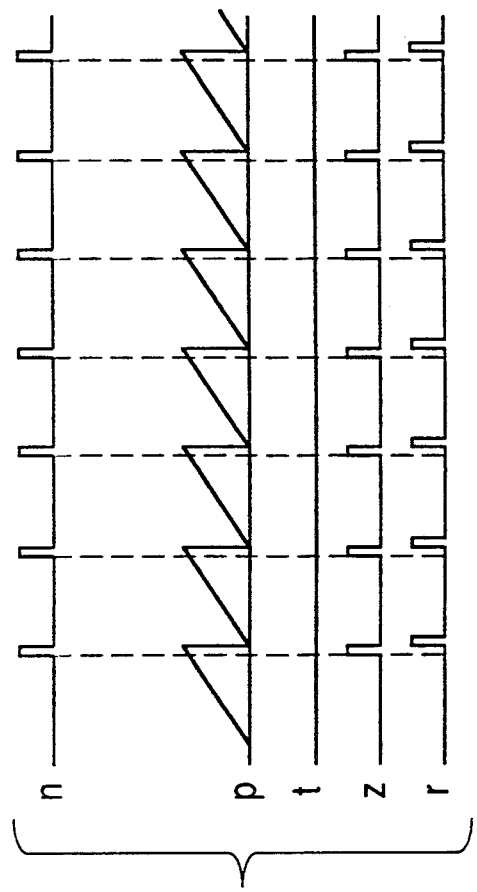

BRUSHLESS DC MOTOR

BACKGROUND OF THE INVENTION

1. Field of the Invention

This invention relates to a brushless DC motor and more particularly, to a brushless DC motor which does not have a position sensor for detecting a rotational position of a permanent magnet rotor.

2. Description of the prior art

Recently, brushless DC motors have been widely used in industrial or audio and video equipment requiring higher reliability for reasons that service life can be improved as well as noise generation can be reduced resulting from such an advantage that they do not need to have a mechanical contact as would be used in conventional DC motors having a brush.

In order to perform the switching operation of a conducting phase of the stator windings of a motor, most of conventional brushless DC motor a rotor position sensor (such as, for example, a Hall Effect Sensor) instead of using brushes. However, the rotor position sensor itself is not cheap and requires sophisticated positional adjustment for setting and an increased amount of wiring so that the cost of the brushless DC motors is large as compared with DC motors having brushes.

In addition, some structural limitations will be frequently imposed thereupon for the reason that a rotor position sensor has to be set inside the motor itself. A recent trend is that accompanied with the reduced size of industrial or audio and video equipment, motors to be used are made small in size and thickness, which means that the sectional space where a rotor position sensor such as the Hall Effect sensor is to be provided becomes extremely small. As a result, several types of brushless DC motor having no position sensor such as, for, example, the Hall Effect Sensor have been previously proposed.

Out of which, a brushless DC motor disclosed, for example, in Japanese Laid-Open Patent Application No. 55-160980 is based on the so-called half wave driving method in which an electric current is supplied unidirectionally to stator windings of the rotor. With this method, counter electromotive forces induced in two stator windings being stationary out of three-phase stator windings are detected, and the signals thus detected are operationally processed to determine the next conducting phase so as to thereby supply an electric current unidirectionally to the stator windings in a successive manner. With this method, however, because the rotor is stationary when starting a motor, no counter electromotive force is generated in each of the stator windings. As a result, in such a brushless DC motor as described above according to the prior art, a starting circuit is specially provided for exciting a specific stator winding so as to thereby determine the initial position of the rotor in advance. In this case, however, even if only one phase of the stator windings is excited in order to determine the initial position of the rotor as shown above, the position of the rotor becomes vibrative and difficult to stabilize, resulting in an increase in starting time.

In addition, the brushless DC motor according to the prior art is based on the half wave driving method in which an electric current is supplied unidirectionally to its stator windings, so that its driving circuit can be made simple in structure on the one hand, but on the other hand, the utility and efficiency of the stator windings are low as compared with a brushless DC motor based on the full wave driving method in which an electric current is supplied bidirectionally to its stator windings, so that a torque to be developed becomes small.

Also, disclosed, for example, in Japanese Laid-Open Patent Application No. 62-260586 is a brushless DC motor which is based on the so-called full wave driving method in which an electric current is supplied bidirectionally to its stator windings. An electric current flowing to its stator windings is switched forcibly and successively when starting by a starting pulse signal outputted from a starting pulse generating circuit so as to thereby drive the motor. When the rotational speed of the motor is accelerated and counter electromotive forces are induced in the stator windings, zero-crossing points of the counter electromotive forces are detected so as to thereby delay its output signal by a constant period of time by a monostable multi-vibrator, thus, the timing of conducting an electric current is determined. In this case, however, even when the stator windings are switched forcibly and successively by a pulse signal outputted from the starting circuit when starting, the rotor becomes vibrative in rotation. As a result, even if a zero-crossing point of each counter electromotive force can be properly detected by a detection circuit, the switching is difficult to be properly changed from the starting mode to drive the rotor by switching the stator windings forcibly and successively to the normal position detecting mode to do it by detecting the zero-crossing points of counter electromotive forces induced in the stator windings. That is, the timing of switching from the starting mode to the normal position detecting mode of the rotor is difficult technologically, resulting in an increase in starting time of the motor.

In addition, a brushless DC motor according to the prior art as described above uses such a method that the conducting phase is determined by delaying a pulse signal generated at the zero-crossing point of a counter electromotive force induced in each stator winding by a constant period of time through a monostable multi-vibrator. In this case, however, the delay time is constant independently of the rotational speed of the motor, which means that it is not suitable for an application where the rotational speed has to be changed, thus lacking in flexibility of application.

Generally, in these brushless DC motors not having a rotor position sensor, the rotor is stationary when starting, and no counter electromotive force is generated in each stator winding. As a result, the conducting phase at the initial stage is not allowed to be determined and such a problem has been further pointed out that they are outstandingly inferior in starting characteristic to DC motors having a rotor position sensor.

Also, these brushless DC motors not having a rotor position sensor are considered as a kind of synchronous motor in that the phase switching is forcibly operated when starting, and the frequency for phase-switching suitable for the starting operation is largely varied depending on the magnitude of a load to be applied to the motor or the inertia of the rotor. In some cases, the zero-crossing point of a counter electromotive force induced in each stator winding may not be properly detected externally, so that such a problem has been further pointed out that the switching operation from the starting mode to drive the rotor by switching the stator windings forcibly and successively to the normal position detecting mode to drive the rotor by detecting the zero-crossing point of each counter electromotive force is difficult to do properly.

In addition, in these brushless DC motors according to the prior art as described above, an electric current flowing to the stator windings for driving comprises a rectangular wave signal with a conducting width of about 120° in terms of electric angle. As a result, in order to reduce a spike voltage induced accompanied with the switching operation, a filter circuit including a comparatively large capacitor is practically required to be provided at a conducting terminal of the stator windings. Also, an electric current flowing to the stator windings is subjected to an ON-OFF operation in an abrupt manner, so that a problem further arises in that vibration and noise can be easily generated when starting and such a trend is accelerated as the rotational speed of the motor is increased.

SUMMARY OF THE INVENTION

In consideration of the above-mentioned problems, an object of this invention is to provide a brushless DC motor which has a good starting characteristic without using a special starting circuit in spite of no need to use a position sensor.

Another object of this invention is to provide a brushless DC motor of the full wave driving method in which an electric current can be supplied bidirectionally to each of the stator windings thereof.

A further object of this invention is to provide a brushless DC motor whose rotational speed can be changed optionally.

Another further object of this invention is to provide a brushless DC motor which does not need to have a filter circuit including a large capacitor as would be necessary to be used in a brushless DC motor according to the prior art as shown above and which can reduce vibration and noise generation to an extremely low level even when rotating at a high speed.

In order to attain the above-mentioned objects, a brushless DC motor of this invention comprises a counter electromotive force detecting circuit for detecting zero-crossing points of counter electromotive forces respectively induced in a plurality of stator windings pulse-shaping them in a successive manner so as to thereby obtain a pulse signal train, a period detecting circuit for measuring a period of the pulse signal period thus obtained and for outputting the pulse signal train itself when the period is within a specific range and for generating a pseudo pulse signal when it exceeds the specific range as in case of starting, a logical pulse generating circuit for generating multi-phase signals in response to an output signal of the period detecting circuit, a slant waveform generating circuit for receiving a pulse outputted from the period detecting circuit and for generating a slant waveform in response to the pulse thus received, a trapezoidal waveform signal forming circuit for forming a trapezoidal waveform signal from a pulse signal outputted from the logical pulse generating circuit and a slant waveform signal outputted from the slant waveform generating circuit, a position signal forming circuit for forming a position signal of a rotor by subtracting a direct current (DC) value from a trapezoidal waveform signal, and a power supplying circuit for supplying electric power to said plurality of stator windings in response to the position signal thus formed.

With the above-mentioned structure, a brushless DC motor of this invention pulse-shapes the zero-crossing points of counter electromotive forces respectively induced in the stator windings to convert them into a pulse signal train. A trapezoidal waveform position signal of the rotor is formed based on the pulse signal train thus obtained. As a result, even if the motor changes its rotational speed, no change of the conducting phase of a stator winding to be subsequently conducted results. Accordingly, a brushless DC motor of this invention can be easily applied to an application where its rotational speed must be changed. This means that a disadvantage of a conventional brushless DC motor not having a rotor position sensor as to become unstable its driving operation when its rotational speed is changed can be eliminated.

In addition, in a brushless DC motor of this invention, even if the counter electromotive force detecting circuit does not output a pulse signal when starting, the period detecting circuit outputs a pseudo pulse signal to switch the conducting phases of the stator windings in a successive manner. As a result, even if a special starting circuit is not provided, a pseudo pulse signal can be easily outputted when starting, and the pseudo pulse signal thus outputted switches the conducting phases of the stator windings in a forcible and successive manner. When the counter electromotive force detecting circuit detects zero-crossing points of the counter electromotive forces, the switching can be rapidly operated from the starting mode to drive the rotor by switching the stator windings forcibly and successively to the normal position detecting mode to drive it by detecting the zero-crossing points of counter electromotive forces induced in the stator windings. Thus, a starting characteristic compatible with that obtained in conventional motors having a rotor position sensor can be provided.

Furthermore, in addition, since it is unnecessary to use a rotor position sensor as would be used in conventional brushless DC motors, a brushless DC motor of this invention makes it possible to eliminate a sophisticated setting position adjustment of the sensor as well as to reduce the amount of wiring, resulting in a vast reduction in cost.

Still furthermore, in addition, since it is unnecessary to provide a rotor position sensor in the motor, no structural limitation can be imposed thereupon, largely contributing to the possibility of making the motor small in size and thickness.

Also, with the above-mentioned structure, the counter electromotive force detecting circuit detects only zero-crossing points of counter electromotive forces induced in the stator windings, so that in spite of no need to use a position sensor such as a Hall Effect Sensor, a brushless DC motor of this invention can supply an electric current bidirectionally to each stator winding, meaning that a brushless DC motor based on the full wave driving method can be easily provided. As a result, as compared with a motor based on the half wave driving method in which an electric current is supplied unindirectionally to each stator winding, a motor outstandingly superior in utility and efficiency of the stator windings as well as in torque to be developed can be provided.

In addition, the phase-switching of an electric current to be supplied to each stator winding can be extremely smoothly carried out by a slant waveform signal generated through the slant waveform generating circuit, so that a filter circuit including a comparatively large capacitor does not have to be connected to a conducting terminal of the stator windings in order to reduce a spike voltage generated with the phase-switching operation as seen in conventional motors. Also, an electric current flowing into a stator winding is not turned ON or OFF abruptly, so that the phase-switching operation can be carried out smoothly, resulting in a motor drive with much less vibration and noise generated.

BRIEF DESCRIPTION OF THE DRAWINGS

FIG. 7 (a) is a diagram showing a signal waveform outputted from each member of the circuit shown in FIG. 6 when starting a motor.

FIG. 7 (b) is a diagram showing a signal waveform outputted from each member of the circuit shown in FIG. 6 when rotating stationarily.

FIG. 9 (c) is a diagram showing a signal waveform outputted from each member of the circuit shown in FIG. 8 when rotating at a low speed.

DESCRIPTION OF THE PREFERRED EMBODIMENTS

Figure 1:
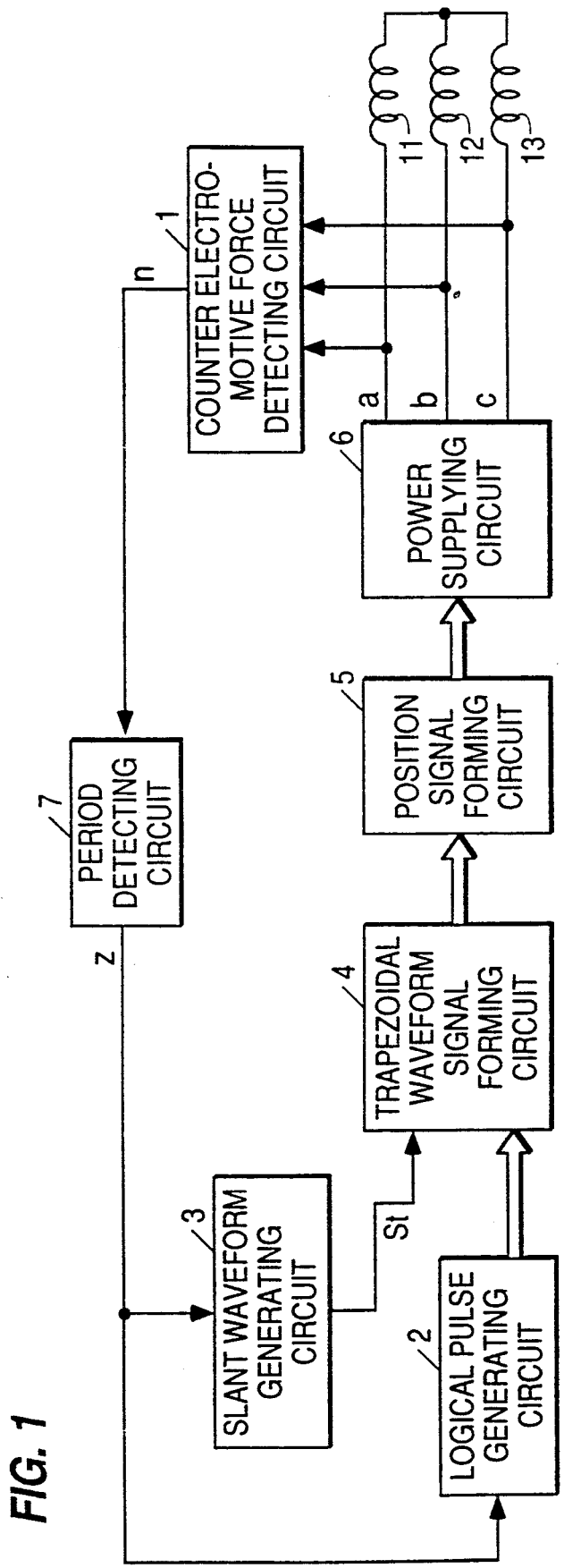
FIG. 1 is a block diagram of a brushless DC motor in accordance with one embodiment of this invention.

Preferred embodiments of this invention will be described below while referring to the drawings.

FIG. 1 is a block diagram of a brushless DC motor in accordance with one embodiment of this invention. In FIG. 1, the reference numeral 1 indicates a counter electromotive force detecting circuit for receiving counter electromotive forces a, b and c respectively induced in three-phase stator windings 11, 12 and 13. The counter electromotive force detecting circuit 1 detects respective zero-crossing points of the three-phase counter electromotive forces a, b and c to convert them into a pulse train n. The pulse train n shows the zero-crossing point of each of the three-phase counter electromotive forces a, b and c thus induced in the stator windings 11, 12 and 13. The pulse train n outputted from the counter electromotive force detecting circuit 1 is inputted to a period detecting circuit 7. The period detecting circuit 7 measures a period of the pulse train n outputted from the counter electromotive force detecting circuit 1 and outputs the pulse train n itself when the period thus measured is within a specific range. When the measured period exceeds the specific range, the period detecting circuit 7 generates a pseudo pulse signal instead of the pulse train n and outputs a pulse signal z. The pulse signal z thus outputted is supplied to a logical pulse generating circuit 2 and a slant waveform generating circuit 3. The logical pulse generating circuit 2 frequency-divides the pulse signal z thus supplied and outputs a six-phase pulse signal having the same frequency as that of the counter electromotive forces induced in the stator windings 11, 12 and 13. The slant waveform generating circuit 3 generates a slant or slope waveform signal st in response to the pulse signal z thus supplied. The six-phase pulse signals generated through the logical pulse generating circuit 2 is sent to a trapezoidal waveform signal forming circuit 4. The trapezoidal waveform signal forming circuit 4 convertibly forms six-phase trapezoidal waveform signals based on the six-phase pulse signals sent from the logical pulse generating circuit 2 and the slant waveform signal st sent from the slant waveform generating circuit 3. The six-phase trapezoidal waveform signals thus formed through the trapezoidal waveform signal synthesizing circuit 4 are sent to a position signal forming circuit 5 so as to thereby form them convertibly into a position signal of the rotor. The position signal thus obtained is inputted to a power supplying circuit 6. The power supplying circuit 6 supplies an electric current bidirectionally to the stator windings 11, 12 and 13 in a successive manner in response to the position signal thus inputted.

With the structure shown above, the operation of a brushless DC motor of this embodiment will be explained in detail below.

Figure 2:
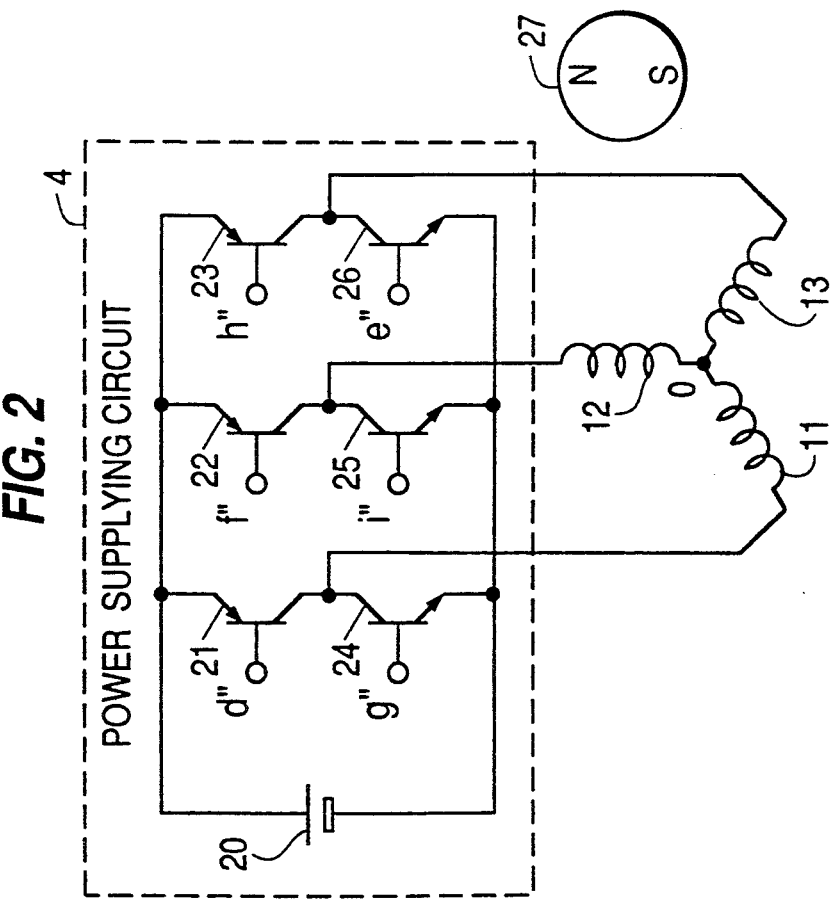
FIG. 2 is a circuit diagram of a motor and a power supplying circuit as shown in FIG. 1.

FIG. 2 is a circuit diagram of a power supplying circuit 6 shown in FIG. 1.

In FIG. 2, the reference numeral 27 indicates a permanent magnet rotor; elements 12 and 13 are stator windings and elemetns 21, 22, 23, 24, 25 and 26 are a driving transistors for supplying an electric current or each of the stator windings 11, 12 and 13 based on their ON-OFF operation. Driving transistors, 21, 22 and 23 are PNP transistors, and driving transistors 24, 25 and 26 are NPN transistors. The reference numeral 20 indicates a power source. A brushless DC motor is generally driven by applying the six-phase position signals obtained in response to a position signal of the rotor 27 respectively to the bases of the driving transistors 21, 26, 22, 23, 24 and 25. In this case, however, the PNP transistors 21, 22 and 23 each is supplied with a signal to its base in the direction that an electric current is to be taken out and on the other, hand, the NPN transistors 24, 25 and 26 each is supplied with a signal to its base in the direction that the current is to be taken in. First, the transistors 21 and 25 conduct to cause an electric current to flow to the stator windings 11 and 12. Next, the transistors 21 and 26 conduct to cause an electric current to flow to the stator windings 11 and 13. Such a phase switching operation is carried out in a successive manner so as to thereby rotate the permanent magnet rotor 27.

Figure 3:
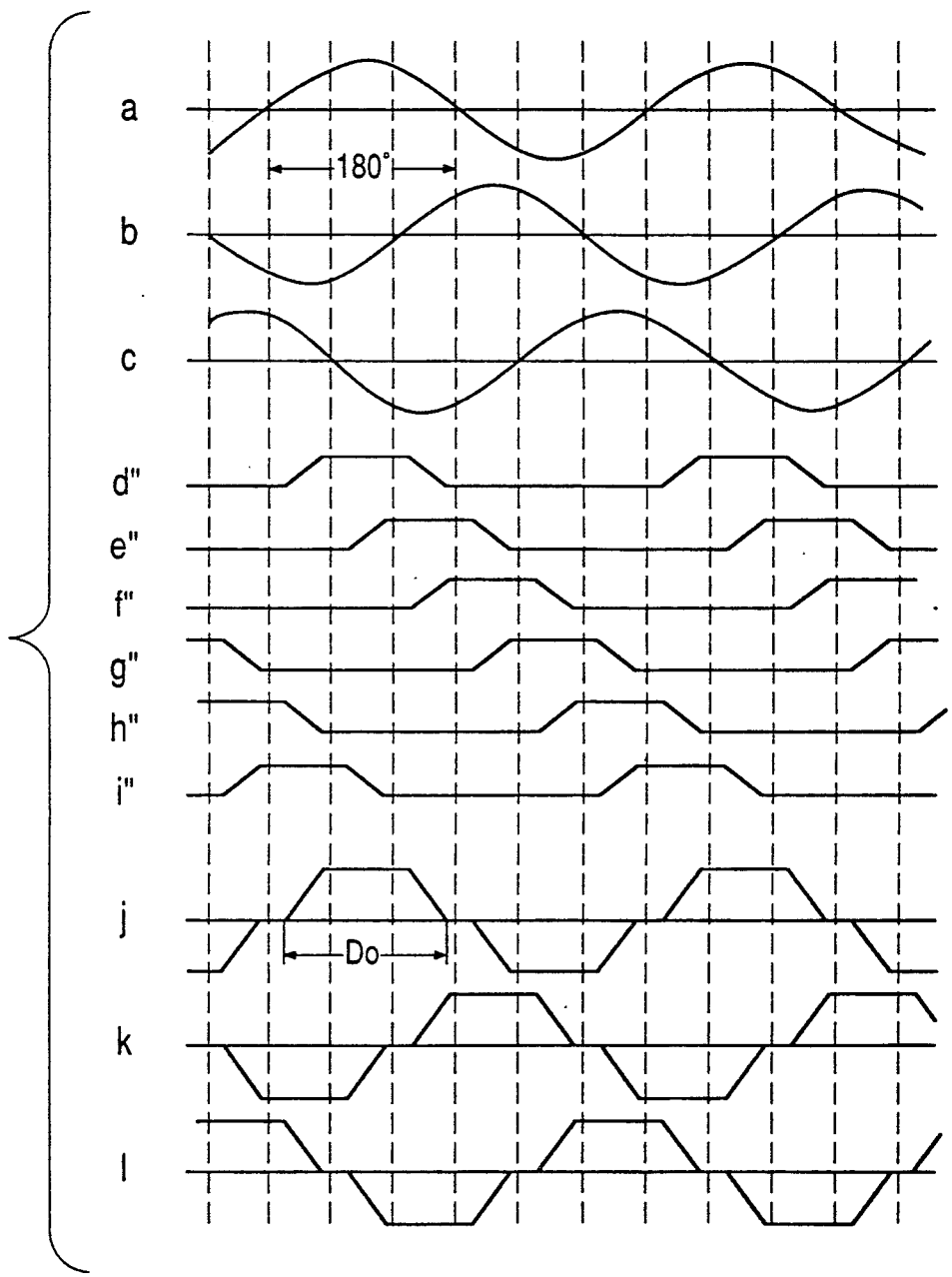
FIG. 3 is a diagram showing a signal waveform outputted from each member of the circuit as shown in FIG. 2.

FIG. 3 shows a signal waveform outputted from each member of the power supplying circuit 6 shown in FIG. 1.

FIGS. 3 a, b and c show counter electromotive forces of the stator windings 11, 12 and 13, respectively. FIGS. 3 d", e", f", g", h"and i" show six-phase pulse signals generated through the position signal forming circuit 5, being equivalent to the six-phase position signals obtained in response to a rotational position of the rotor 27. These signals are trapezoidal in waveform, and the method of obtaining such a trapezoidal waveform signal will be explained in detail later when the position signal forming circuit 5 is described by referring to FIGS. 13 and 14.

Each of the six-phase position signals as shown at d", e", f", g", h" and i" of FIG. 3 is inputted to a corresponding one of the driving transistors 21, 26, 22, 24, 23 and 25. On the one hand, however, for each of the PNP transistors 21, 22 and 23, the signal is supplied to its base in the direction that an electric current is to be taken out and on the other hand, for each of the NPN transistors 24, 25 and 26, it is supplied to its base in the direction that the electric current is to be taken in. The base current supplied to each transistor is amplified so as to thereby cause an electric current which is proportional to each base current to flow through a corresponding collector. As a result, electric currents as shown in FIGS. 3 j, k and 1 are supplied bidirectionally to the stator windings 11, 12 and 13. Such a phase switching, operation is carried out in a successive manner so as to thereby rotate the permanent magnet rotor 27. In addition, the alphabetical symbol Dc in FIG. 3 j indicates a conducting width of a driving current to be supplied to the stator winding 11. The conducting width Dc is made smaller than 180° in terms of electric angle. That is, each of driving currents induced in the stator windings 11, 12 and 13 has a time period during which an electric current becomes zero. Such a time period is generated in the vicinity including a zero crossing point of a counter electromotive force induced in each of the stator windings 11, 12 and 13.

Explanations follow on the signal processing operation of each member of this embodiment.

Figure 4:
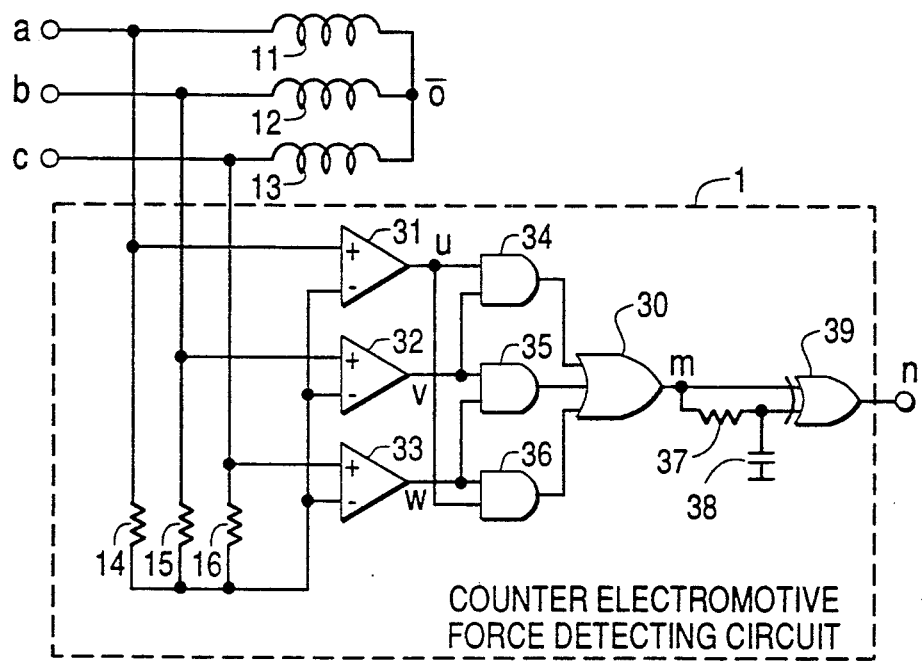
FIG. 4 is a circuit diagram of a counter electromotive force detecting circuit as shown in FIG. 1.

FIG. 4 is a circuit diagram of a counter electromotive force detecting circuit 1 as shown in FIG. 1.

In FIG. 4, reference numerals 14, 15 and 16 each indicate a resistor having one terminal connected to a corresponding one of the stator windings 11, 12 and 13 and having its other terminal connected to a common connecting points; Elements 32 and 33 are comparators each having one input terminal (+) connected to a corresponding one of the stator windings 11, 12 and 13 and each having its other terminal (−) connected to the common connecting point of the resistors 14, 15 and 16; elements 34, 35 and 36 are AND circuits. The AND circuits 34,,35 and 36 have their input terminals connected to output terminals of the comparators 31 and 32, the comparators 32 and 33, and the comparators 33 and 31, respectively. The reference numeral 30 indicates an OR circuit which receives outputs from the AND circuits 34, 35 and 36 and outputs an OR output signal m, and element 39 is an exclusive OR circuit which receives the output signal m outputted from the OR circuit 30 at one input terminal thereof and which receives at another input terminal thereof a signal obtained by delaying the output signal m from the OR circuit 30 by a time constant specified by a resistor 37 and a capacitor 38. An output of the exclusive OR circuit 39 is sent out as a pulse train n from the output terminal o f the counter electromotive force detecting circuit 1.

Figure 5:
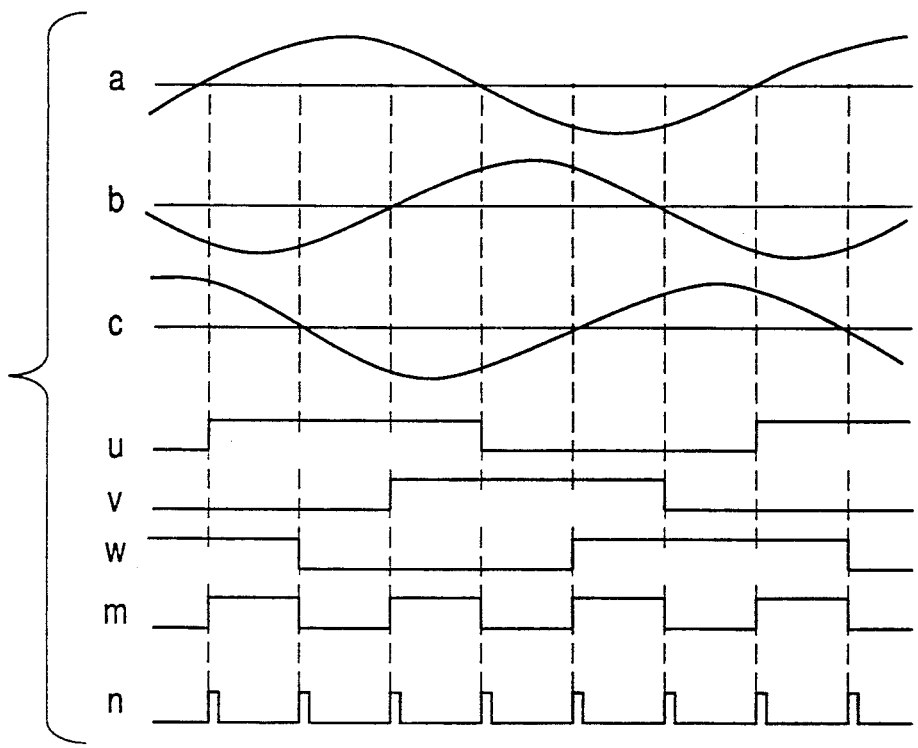
FIG. 5 is a diagram showing a signal waveform outputted from each member of the circuit shown in FIG. 4.

The operation of the counter electromotive force detecting circuit 1 shown in FIG. 4 will be explained by referring to FIG. 5.

The resistors 14, 15 and 16 are respectively connected to the stator windings 11, 12 and 13, so that the same electric potential as that of the neutral point 0 of the stator windings 11, 12 and 13 can be obtained at the common connecting point of the resistors 14, 15 and 16. As a result, as the motor, there is no need to take out a signal line specifically from the neutral point of the stator windings 11, 12 and 13. The counter electromotive forces a, b and c respectively induced in the stator windings 11, 12 and 13 are respectively inputted to the terminals (+) of the comparators 31, 32 and 33 shown in FIG. 4 and the electric potential of the neutral point of the stator windings 11, 12 and 13 obtained at the common connecting point of the resistors 14, 15 and 16 is inputted to the input terminals (−) thereof. Thus, at terminals of the comparators 31, 32 and 33, pulse signals having waveforms as shown in FIGS. 5 u, v and w can be respectively obtained by waveform-shaping the counter electromotive forces a, b and c. The pulse edges of the waveforms u, v and w respectively coincide with the zero-crossing points of the counter electromotive forces a, b and c. As a result, from the output terminal of the OR circuit 30, a waveform signal as shown in FIG. 5 m is obtained, which has a pulse train having rising and falling pulse edges which coincide with the zero-crossing points of the three-phase counter electromotive forces a, b and c. FIG. 5 n shows a waveform of a signal obtained by differentiating both edges of the output pulse signal m of the OR circuit 30. That is, the exclusive OR circuit 30 outputs a pulse signal at the zero-crossing point of each of the three-phase counter electromotive forces a, b and c so as to thereby output a pulse train n having six pulses differing (by 60° in terms of electric angle) per period of each of the counter electromotive forces a, b and c.

In this case, however, in order to properly detect a zero-crossing point of a counter electromotive force of each terminal of the stator windings 11, 12 and 13, it is necessary to make an electric current flowing to each stator finding equal to zero in the vicinity of the zero-crossing point of each counter electromotive force as shown in FIG. 3. This is for the reason that if an electric current is flowing in the vicinity of the zero-crossing point, each terminal of the stator windings 11, 12 and 13 are supplied not only a counter electromotive force induced in each stator winding but also with a voltage drop component generated by a driving current flowing into a winding resistance, so that the proper detection of a zero-crossing point becomes impossible. Particularly when starting the motor, although suitably large counter electromotive forces are not induced in the stator windings 11, 12 and 13, larger electric currents than those required under the normal operation of the motor are flowing to the stator windings 11, 12 and 13. As a result, in order to detect zero-crossing points of the counter electromotive forces a, b and c properly, it is necessary to make sure that an electric current flowing to a stator winding is made equal to zero in the vicinity of the zero-crossing point thereof. Thus, particularly when starting the motor, it is preferable to select the conducting width Dc shown in FIG. 3 so as to be considerably smaller than 180° in terms of electric angle even from the viewpoint of the prevention of the counter electromotive force detecting circuit 1 from malfunctioning in detecting zero-crossing points of counter electromotive forces.

Next, the operation of the period detecting circuit 7 shown in FIG. 1 will be explained in detail below.

Figure 6:
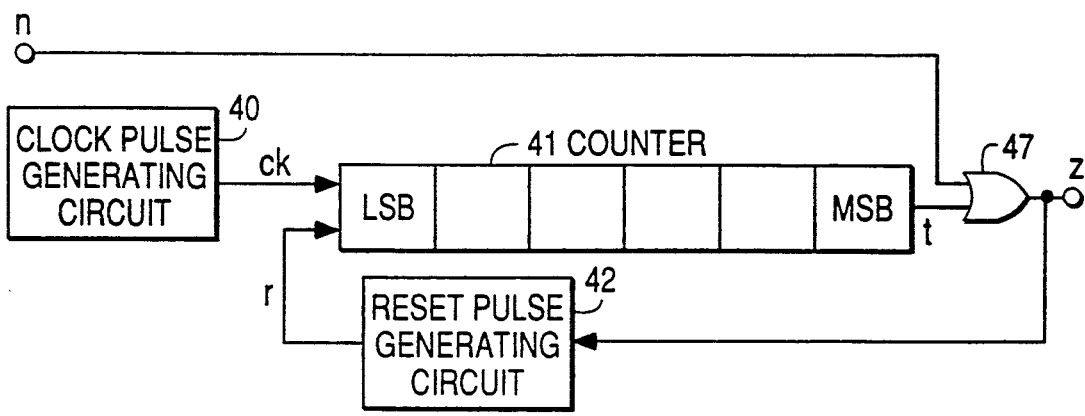
FIG. 6 is a circuit diagram of a period detecting circuit as shown in FIG. 1.

FIG. 6 is a block diagram of a period detecting circuit 7 shown in FIG. 1. FIG. 7 (a) is a diagram showing a signal waveform outputted from each member of the circuit shown in FIG. 6 when starting the motor. Fig 7 (b) is a diagram showing a signal waveform outputted from each member of the circuit shown in FIG. 6 when rotating stationarily.

In FIG. 6, the reference numeral 41 indicates a counter and 40 indicates a clock pulse generating circuit. The counter 41 outputs a carry flag signal t when its count value exceeds a specific value. The clock pulse generating circuit 40 generates a clock pulse ck. The clock pulse ck is inputted to the counter 41. The reference numeral 47 indicates a two-input OR circuit which receives a pulse n outputted from the counter electromotive force detecting circuit 1 and the carry flag t outputted from the counter 41 and outputs a pulse signal z as an output of the pulse detecting circuit 7. A reset pulse generating circuit 42 receives the pulse z from the OR circuit 47 and outputs a reset pulse r to the counter 41 for resetting the count value thereof. Additionally, the carry flag t is equivalent to a pseudo pulse generated by the period detecting circuit 7.

The operation of the period detecting circuit 7 shown in FIG. 6 when a motor is started will be explained first by referring to FIG. 7 (a).

In FIG. 7 (a), n is a pulse signal outputted from the counter electromotive force detecting circuit 1. When starting the motor, the three-phase stator windings 11, 12 and 13 do not induce counter electromotive forces, and the pulse signal n is not outputted therefrom. The counter 41 continues to count the clock pulse ck until the reset pulse r is outputted from the reset pulse generating circuit 42. As a result, the count value of the counter 41 increases montonically and when it exceeds a specific value, the carry flag t is outputted therefrom. The carry flag t is outputted through the OR circuit 47 as the pulse signal z and at the same time, sent to the reset pulse generating circuit 42. The reset pulse generating circuit 42 outputs a reset pulse r as shown in FIG. 7 (a) to the counter 41. As a result, the count value of the counter 41 is reset instantly. Thus, the count value of the counter 41 is obtained as a saw tooth waveform signal as illustrated at p of FIG. 7 (a). In addition, between the phase of the pulse z and that of the reset pulse r, there exists a relationship as shown in FIG. 7 (a). The fact that the reset pulse r is delayed in phase from the pulse z is to make sure of providing the pulse t outputted from the counter 41 with a suitable pulse width. Also, FIG. 7 (a), a pulse width of each of the pulses t, z and r is made large for the sake of convenience, but it is sufficiently small as compared with the pulse period.

Next, the operation of the period detecting circuit 7 shown in FIG. 6 when a motor is being rotated normally will be explained by referring to FIG. 7 (b).

The counter electromotive force detecting circuit 1 detects zero-crossing points of the counter electromotive forces a, b and c respectively induced in the three-phase stator windings 11, 12 and 13 and outputs a pulse signal n. The pulse signal n is inputted to the OR circuit 47 so as to thereby output a pulse z and at the same time, sent to the reset pulse generating circuit 42. The reset pulse generating circuit 42 outputs a reset pulse r as shown in FIG. 7 (b) to the counter 41 so as to thereby reset the count value thereof instantly. As a result, the count value of the counter 41 is illustrated as a saw tooth waveform signal as shown at p of FIG. 7 (b). Also, in this case, the counter electromotive force detecting circuit 1 outputs the pulse signal n before the count value of the counter 41 reaches a specific value, so that the count value is reset and a carry flag t is not outputted. As clear from the above-mentioned explanation, when starting the motor, the counter electromotive force detecting circuit 1 does not output the pulse signal n, but instead, as a pseudo pulse signal, the carry flag t is outputted as the pulse signal z at a constant width. In addition, when the motor is being rotated normally, the output pulse signal n of the counter electromotive force detecting circuit 1 is outputted as the pulse signal z.

Next, the operation of a slant waveform generating circuit 3 shown in FIG. 1 will be explained in detail below.

Figure 8:
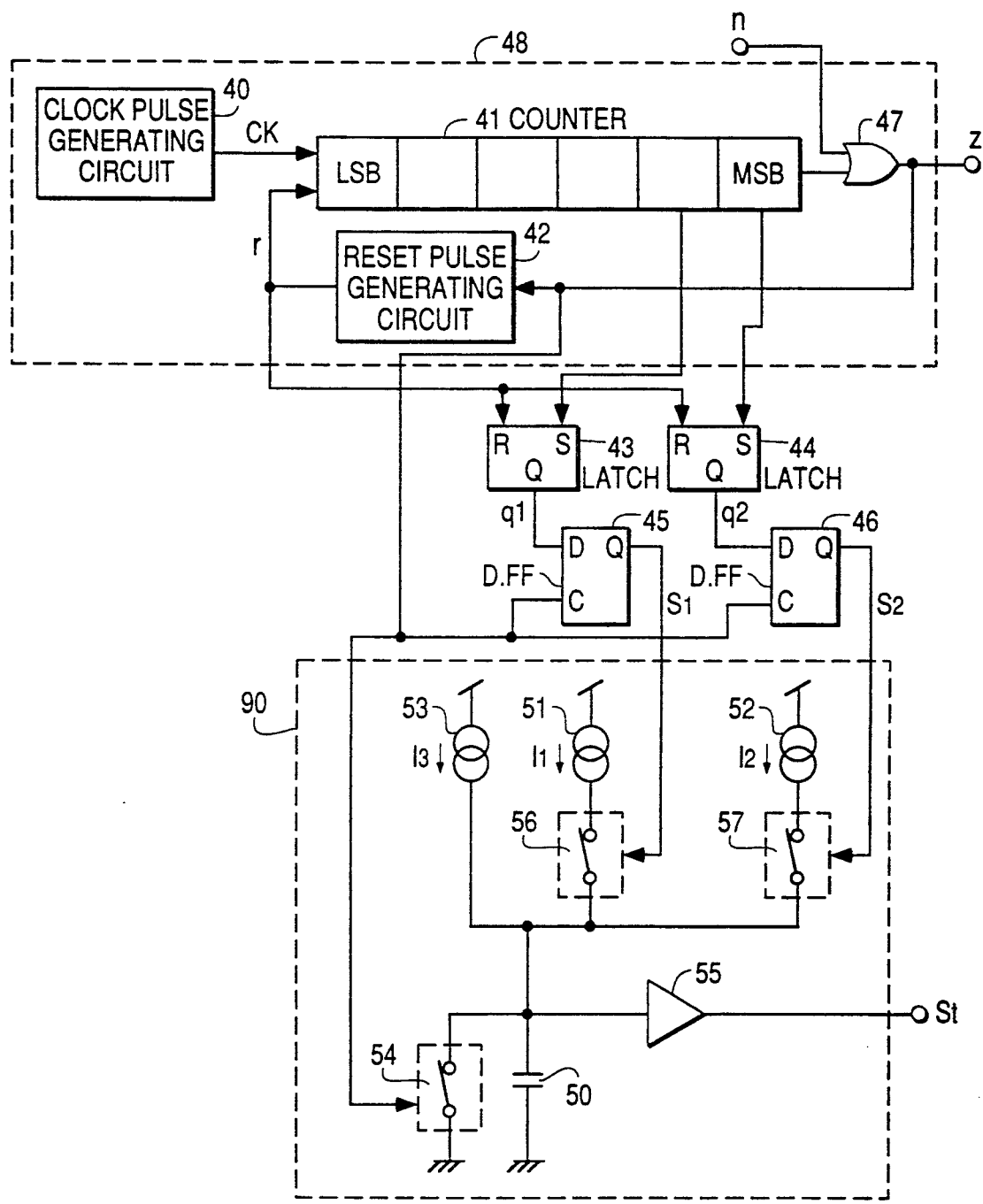
FIG. 8 is a circuit diagram of a slant waveform generating circuit as shown in FIG. 1.
Figure 9A:
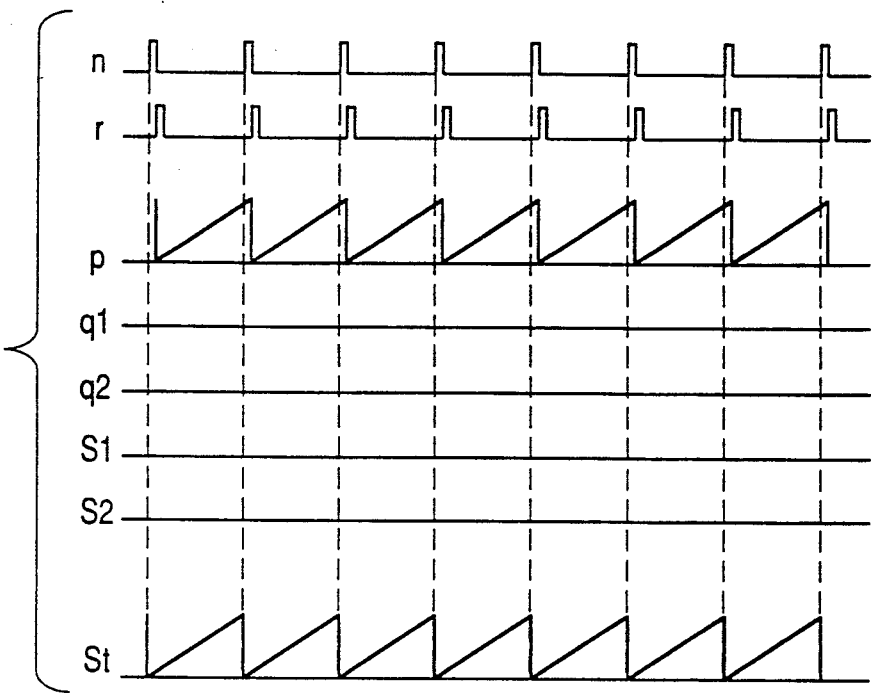
FIG. 9 (a) is a diagram showing a signal waveform outputted from each member of the circuit shown in FIG. 8 when rotating at a high speed.
FIG. 9(b) is a diagram showing a signal waveform outputted from each member of the circuit shown in FIG. 8 when rotating at a moderated speed.
Figure 9B:
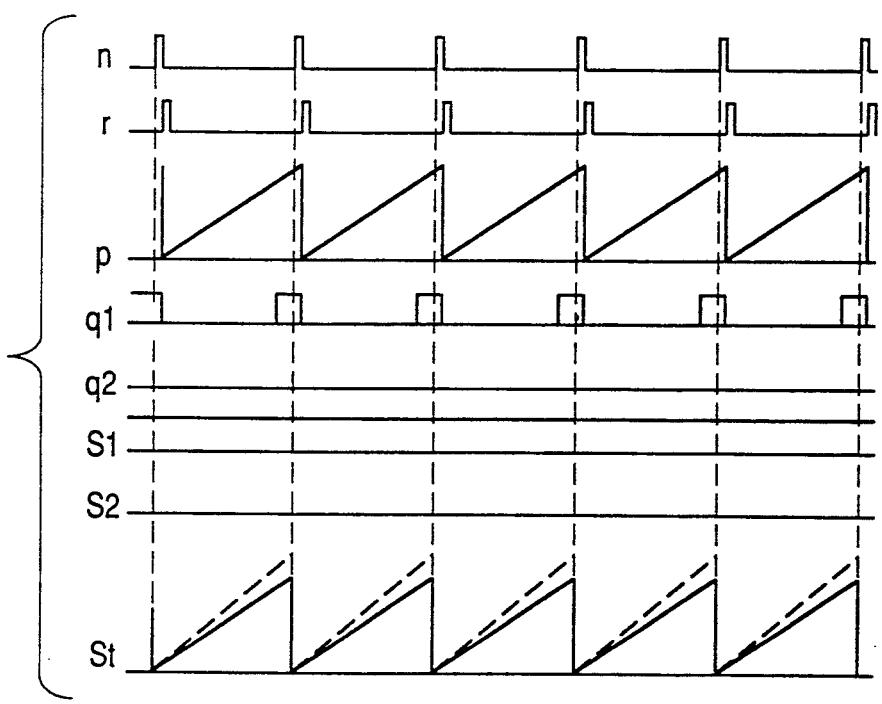
Figure 9C:
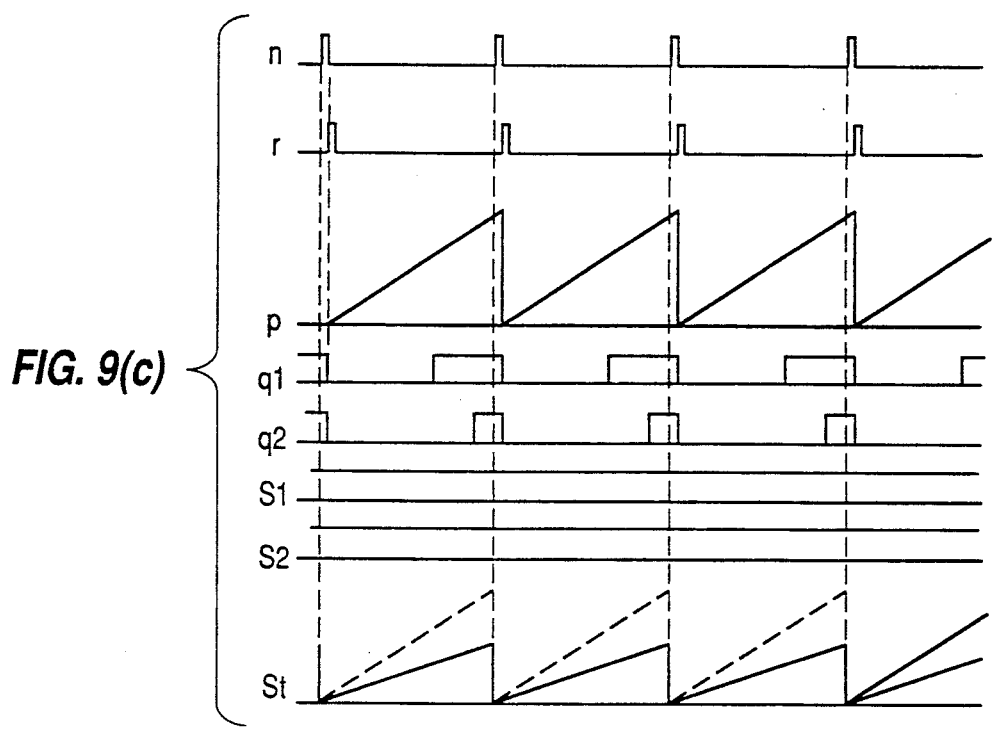

FIG. 8 is a circuit diagram of a slant waveform generating circuit 3 of this embodiment. FIGS. 9(a)–9(c) are diagrams showing a signal waveform outputted from each member of the circuit shown in FIG. 8. In FIG. 8, the reference numeral 48 indicates the period detecting circuit 7 shown in FIG. 6, which is shown again for the reason that the pulse r outputted from the reset pulse generating circuit 42 and an output of an intermediate bit and that of the most significant bit of the counter 41 are used in the slant waveform generating circuit 3.

In FIG. 8, the reference numerals 43 and 44 indicate a first latch circuit and a second latch circuit, respectively. To a set terminal S of the first latch circuit 43 is connected an output of the intermediate bit of the counter 41 and to a set terminal S of the second latch 44 is connected an output of the most significant bit of the counter 41. The reset pulse r outputted from the reset pulse generating circuit 42 is sent to each of reset terminals R of the first latch circuit 43 and second latch circuit 44 thereby to reset the contents to be latched. The reference numerals 45 and 46 indicate a first D-flip-flop and a second D-flip-flop, respectively. Input terminal D of each of the first and second D-flip-flops 45 and 46 is connected to an output terminal Q of each of the first and second latch circuits 43 and 44, and to a clock terminal C of each of the first and second D-flip-flops 45 and 46 is inputted the output pulse z from the period detecting circuit 7. A capacitor 50 is used for the charging or discharging application and generates a saw tooth waveform signal in response to the pulse signal z of the period detecting circuit 7. A first constant-current supplying circuit 51, a second constant-current supplying circuit 52 and a third constant-current supplying circuit 53 each supplies a charging current to the capacitor 50, in which magnitudes of the charging currents to be supplied thereto are indicated by I1, I2 and I3, respectively. Out of which, the first and second constant-current supplying circuits 51 and 52 are connected respectively through a switch 56 and a switch 57 to the capacitor 50. The switches 56 and 57 are operated in response to output signals from the output terminals Q of the first and second D-flip-flops 45 and 46 respectively in such a way that they are switched OFF when the output signals therefrom are at an "H" (high) level and they are at an switched ON when they are "L" (low) level. That is, the charging current to be supplied to the capacitor 50 is adapted to be changed in response to the ON-OFF operations of the switches 56 and 57. The reference numeral 54 indicates a resetting switch for discharging an electric charge stored in the capacitor 50, and element 55 is a buffer amplifier whose input terminal is connected to the capacitor 50. An output terminal of the buffer amplifier 55 becomes the output terminal of the slant waveform generating circuit 3. In FIG. 8, the charging and discharging capacitor 50, three constant-current supplying circuits 51, 52 and 53, two switches 56 and 57, resetting switch 54 and buffer amplifier 55 constitute a waveform generating circuit 90 of the slant waveform generating circuit 3.

The operation of the slant waveform generating circuit 3 shown in FIG. 8 when the permanent magnet rotor 27 is being rotated at a high speed will be explained first by referring to FIG. 9 (a).

FIG. 9(a), n is a pulse signal outputted from the counter electromotive force detecting circuit 1. The rising edges of the pulse signal n indicate zero-crossing points of the counter electromotive forces a, b and c respectively induced in the three-phase stator windings 11, 12 and 13. The pulse width of the signal n is equivalent to 60° in terms of electric angle. The signal r is a reset pulse signal outputted from the reset pulse generating circuit 42. The pulse signal z and the reset pulse signal r are related in phase as shown in FIG. 9 (a), in which the reset pulse signal r is delayed in phase from the pulse signal z. This is to make sure of transmitting the bit value of the counter 41 to the first and second latch circuits 43 and 44. In addition, referring to FIG. 9 (a), a pulse width of each of the pulse z and reset pulse r is made large for the sake of convenience; it is sufficiently small as compared with the pulse period.

The counter 41 continues to count the clock pulse ck until the reset pulse generating circuit 42 outputs the reset pulse signal r. The reset pulse signal r is equal in period to the pulse signal z outputted from the period detecting circuit 6, (in this case, the pulse z is equal to the pulse n outputted from the counter electromotive force detecting circuit 1), which means that the count value of the counter 41 becomes a count value of the period of the pulse signal n outputted from the counter electromotive force detecting circuit 1. This state is shown at p of FIG. 9 (a).

When the permanent magnet rotor 27 is under a high speed rotation, the count value of the counter 41 becomes sufficiently small, and a bit value of the counter 41 inputted to the set terminal S of each of the first and second latch circuits 43 and 44 always becomes an "L", and an output signal outputted from the output terminal Q of each of the first and second latch circuits 43 and 44 also becomes "L". As a result, the input terminal D of each of the first and second D-flip-flops 45 and 46 receives an "L" signal outputted from the output terminal Q of each of the first and second latch circuit 43 and 44, and the clock terminals C of the first and second D-flip-flops 45 and 46 receive through the OR circuit 47 the pulse signal n outputted from the counter electromotive force detecting circuit 1, so that an output signal of the output terminal Q of each of the first and second D-flip-flops 45 and 46 also remains as an "L".

Therefore, the switches 56 and 57 both become switched ON, so that the capacitor 50 is supplied with a charging current (I1+I2+I3) obtained by summing up the currents I1, I2 and I3 respectively outputted from the first, second and third constant-current supplying circuits 51, 52 and 53. The capacitor 50 starts to be charged on a constant slant. However, when the pulse signal n is inputted, the resetting switch 54 is switched ON momentarily, so that an electric charge stored in the capacitor 50 is discharged instantly. This state is shown at st of FIG. 9 (a). As explained above, a saw tooth waveform signal st equal in phase to the pulse signal n is outputted from the slant waveform generating circuit 3.

Next, the operation of the slant waveform generating circuit 3 shown in FIG. 8 when the permanent magnet rotor 27 is being rotated at a moderate speed will be explained by referring to FIG. 9 (b).

In case that the permanent magnet rotor 27 is under a moderate speed rotation, suppose that the pulse signal n outputted from the counter electromotive force detecting circuit 1 is longer in period than in the case that it is under the high speed condition, and the count value of the counter 41 becomes larger than that in the case of being rotated at a high speed, so that the bit value inputted to the set terminal S of the first latch circuit 43 is changed from "L" to "H" and the value inputted to the set terminal S of the second latch circuit 44 always becomes "L". So supposed as above that from the output terminal Q of the first latch circuit 43, a signal repetitively becoming "L" and "H" is outputted and on the other hand, from the output terminal Q of the second latch circuit 44, a signal which is always an "L" is outputted. These states are shown at q1 and q2 of FIG. 9 (b). As a result, when the pulse signal n outputted from the counter electromotive force detecting circuit 1 is inputted to the clock terminal C of each of the first and second D-flip-flops 45 and 46, since the input terminals D of the first and second D-flip-flops 45 and 46 are respectively provided with signals of "H" and "L" outputted from the output terminals Q of the first and second latch circuits 43 and 44, output signals of the output terminals Q of the first and second D-flip-flops 45 and 46 become "H" and "L" as shown at s1 and s2 of FIG. 9 (b), respectively.

As a result, the switch 56 is switched OFF and the switch 57 is switched ON, and the capacitor 50 is supplied only with charging currents outputted from the second and third constant-current supplying circuits 52 and 53, the magnitude of which is expressed as (I1+I2). The charging current becomes small as compared with the case of being rotated at a high speed, which means that the capacitor 50 starts to be charged on a constant slant gentler than that in the case of being rotated at a high speed. This state is shown at st of FIG. 9 (b). In addition, the waveform shown by dotted lines at st of FIG. 9 (b) is a slant waveform obtained when the same charging current as to be supplied when rotating at a high speed, or (I1+I2 I3) is supplied to the capacitor 50 when rotating at a moderate speed. As shown by the continuous line at st of FIG. 9 (b), by varying the magnitude of a charging current to be supplied to the capacitor 50 in response to the rotational speed of the rotor 27, the peak value of a slant waveform when rotating at a moderate speed can be made equal in magnitude to that when rotating at a high speed. As clear from the above mentioned explanations, even when rotating at a moderate speed, the slant waveform generating circuit 3 can generate a slant waveform signal st equal in phase to the pulse signal z and in peak value to that obtained when rotating at a high speed.

Similarly, the operation of the slant waveform generating circuit 3 when rotating the permanent magnet rotor 27 at a low speed will be explained below by referring to FIG. 9 (c).

When the permanent magnet rotor 27 is being rotated at a low speed, a period of the pulse signal n outputted from the counter electromotive force detecting circuit 1 becomes longer than that obtained when it is being rotated at a moderate or high speed, and the count value of the counter 41 becomes larger than that obtained when rotating at a moderate speed. Thus, the bit value inputted from the counter 41 to the set terminal S of the first latch circuit 43 and the bit value inputted therefrom to the set terminal S of the second latch circuit 44 both are changed from "L" to "H", and both of an output signal from the output terminal Q of the first latch circuit 43 and that from the output terminal Q of the second latch circuit 44 repetitively become "L" and "H". These states are shown at q1 and q2 of FIG. 9 (c). As a result, when the pulse signal n is inputted to the clock terminals C of the first and second D-flip-flops 45 and 46, the input terminals D of the first and second D-flip-flops 45 and 46 receive a signal of "H" respectively from the output terminals Q of the first and second latch circuits 43 and 44, so that output signals from the output terminals Q of the first and second D-flip-flops 45 and 46 become "H" as shown at s1 and s2 of FIG. 9 (c).

Accordingly, the switches 56 and 57 are switched OFF and the capacitor 50 is supplied with a charging current I3 from the third constant-current supplying circuit 53. In this case, the charging current to be supplied is made smaller than that obtained when rotating at a high or moderate speed, which means that the capacitor 50 starts to be charged on a constant slant gentler than that obtained when rotating at a moderate speed. This is shown at st of FIG. 9 (c). The waveform shown by dotted lines at st of Fib. 9 (c) shows a slant waveform obtained when the same charging current as to be supplied in case of being rotated at a high speed, or (I1+I2+I3) is supplied to the capacitor 50 when rotating at a low speed. As shown by the continuous line at st of FIG. 9 (c), by varying the magnitude of a charging current to be supplied to the capacitor 50 in response to the rotational speed of the permanent magnet rotor 27, the peak value of a slant waveform when rotating at a low speed can be made equal in magnitude to that when rotating at a high speed. As clear from the above-mentioned explanations, even when rotating at a low speed, the slant waveform generating circuit 3 can generate a slant waveform signal st equal in phase to the pulse signal n and in peak value to that obtained when rotating at a high speed.

Figure 10:
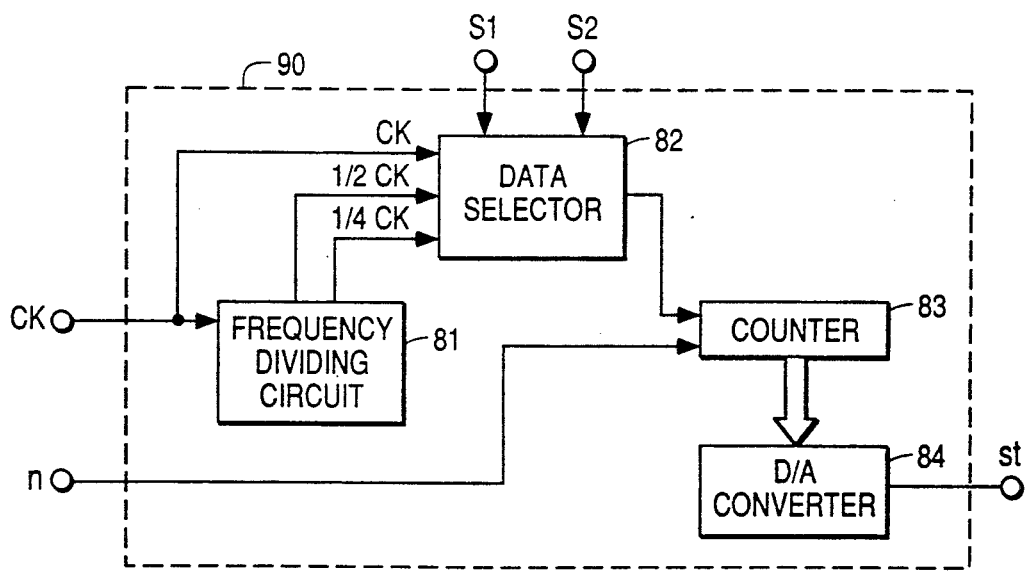
FIG. 10 is a block diagram showing a main circuit of a slant waveform generating circuit in accordance with another embodiment of this invention.

FIG. 10 is a block diagram of the main circuit of a slant waveform generating circuit 3 according to another embodiment of the circuit shown in FIG. 1.

The circuit shown in FIG. 10 is replaced the waveform generating circuit 90 shown in FIG. 8 with a digital circuit. FIG. 10 shows only the arrangement of the waveform generating circuit 90.

In FIG. 10, the reference numeral 81 indicate a frequency dividing circuit. The frequency dividing circuit 81 frequency-divides an inputted clock signal ck by two and four to generate an output clock signals. A data selector 82 selects one clock signal from the three clock signals ck, ck/2 and ck/4 and outputs the clock signal selected, which is switched by means of the input signals s1 and s2. A counter 83 receives an output signal from the data selector 82 as a clock input. In addition, the counter 83 receives the pulse signal n from the counter electromotive force detecting circuit 1 for resetting the count value of the counter 83. A D-A (Digital-Analog) converter 84 converts a digital value of the counter 83 into an analog value. Output terminal of the D-A converter 84 becomes the output terminal of the slant waveform generating circuit 3 to output a signal st.

The operation of the slant waveform generating circuit 3 shown in FIG. 10 when the permanent magnet rotor 27 is being rotated at a low, moderate or high speed as shown in the case of using FIG. 8 will be explained below.

The count value of the counter 83 increases monotonically with an increase in time, and the output of the D-A converter 84 for converting a digital value of the counter 83 into an analog value increases on a constant slant in the same manner as in the case of using FIG. 8. In this case, however, when the pulse signal n is inputted to the counter 83, the content of the counter 83 is reset instantly, so that an output signal from the D-A converter 84 becomes a slant waveform signal st having a sawtooth form. When the rotor 27 is being rotated at a high speed, similar to the case of using FIG. 8, both output signals of the first and second D-flip-flops 45 and 46, or s1 and s2 become "L". Under such a condition, the data selector 82 selects the clock signal ck. When rotating at a moderate speed, s1 becomes "H", and s2 becomes "L", and the data selector 82 selects the clock signal ck/2. When rotating at a low speed, both of s1 and s2 become "H", and the data selector 82 selects the block signal ck/4. This means that as the rotation is changed in speed from high, moderate to low level, the frequency of a clock signal that the data counter 82 selects decreases in the order of ck, ck/2 and ck/4, so that even if the period of the pulse signal n becomes long due to the reduction of the rotational speed, the count value of the counter 82 is substantially equal independently of the rotational speed of the rotor 27. As a result, the peak value of the output signal st obtained by converting a content of the counter 83 through the D-A converter 84 can be substantially equal as shown in the case of using FIG. 8, so that the slant waveform generating circuit 3 can generate a slant waveform signal st equal in phase to the pulse signal n and substantially equal in peak value independently of the rotational speed of the rotor 27.

Figure 11:
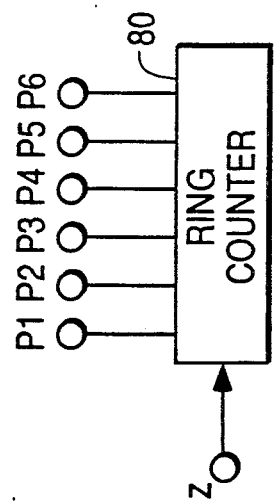
FIG. 11 is a circuit diagram of a logical pulse generating circuit as shown in FIG. 1.
Figure 12:
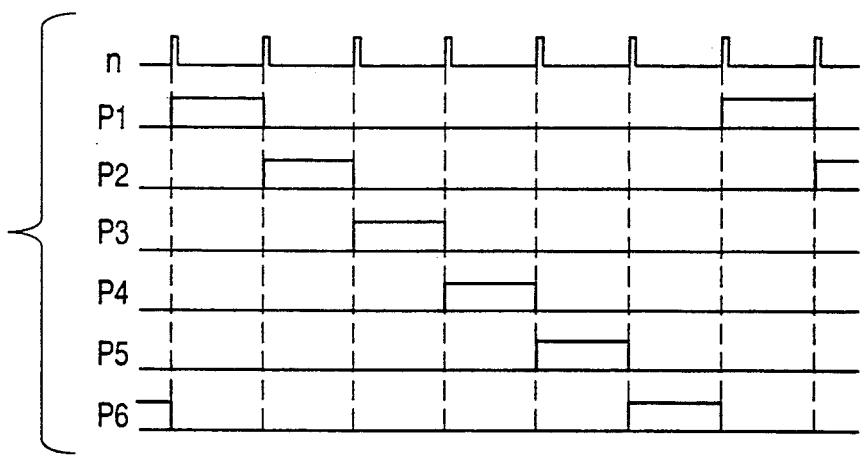
FIG. 12 is a diagram showing a signal waveform outputted from each member of the circuit shown in FIG. 11.

FIG. 11 is a circuit diagram of a logical pulse generating circuit 2 shown in FIG. 1. FIG. 12 is a diagram showing a waveform outputted from each member of the circuit shown in FIG. 11.

In FIG. 11, the reference numeral 80 indicates a six-phase ring counter which receives the pulse signal z from the period detecting circuit 7. Six output terminals thereof respectively output six-phase pulse signals of p1, p2, p3, p4, p5 and p6 as shown in FIG. 12. These pulse signals each has a pulse width of 60° in terms of electric angle and is sent to the trapezoidal waveform signal forming circuit 4.

Next, the operation of the trapezoidal waveform signal forming circuit 4 shown in FIG. 1 will be explained in detail below.

Figure 13:
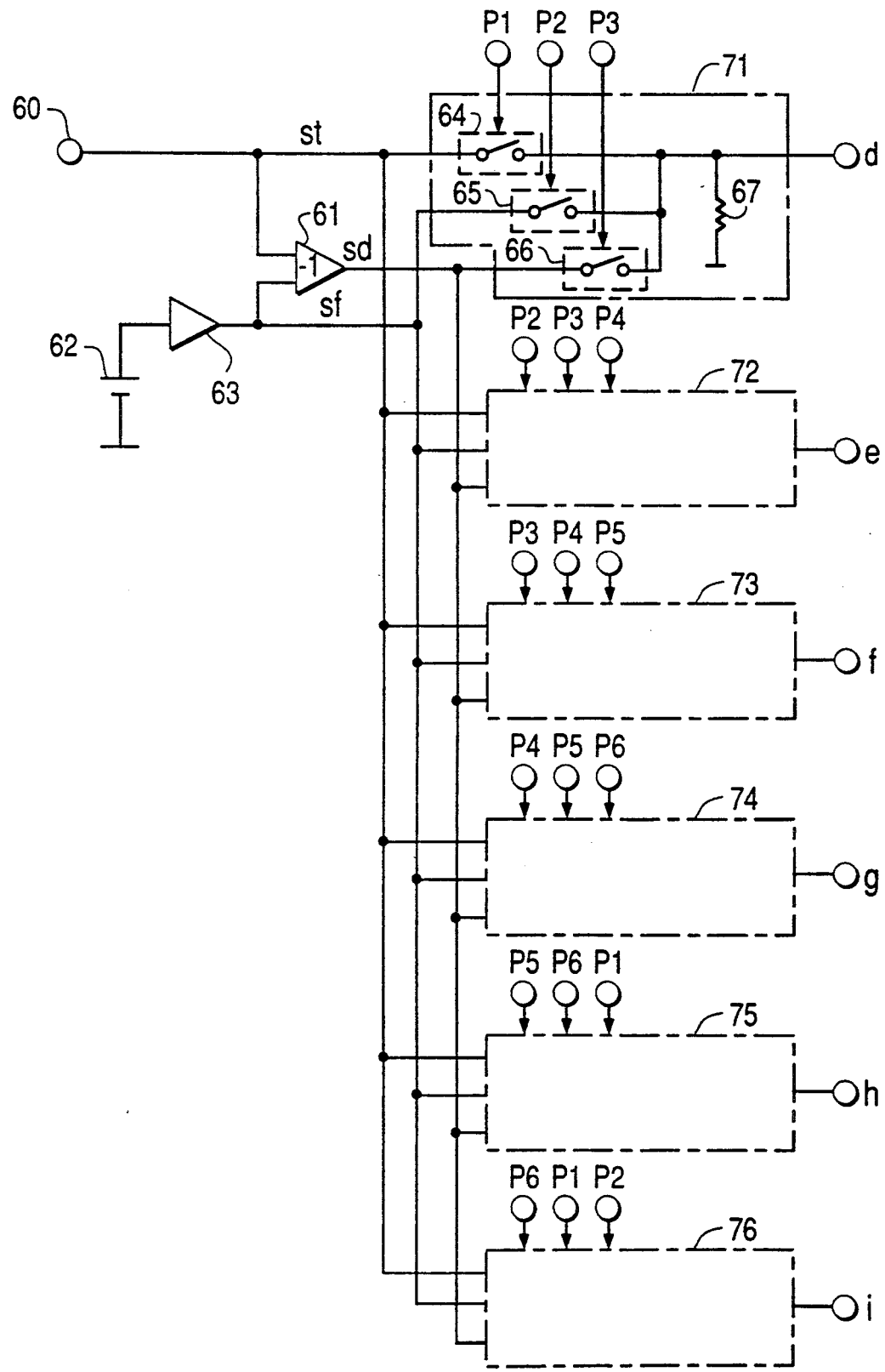
FIG. 13 is a circuit diagram of a trapezoidal waveform signal forming circuit as shown in FIG. 1.
Figure 14:
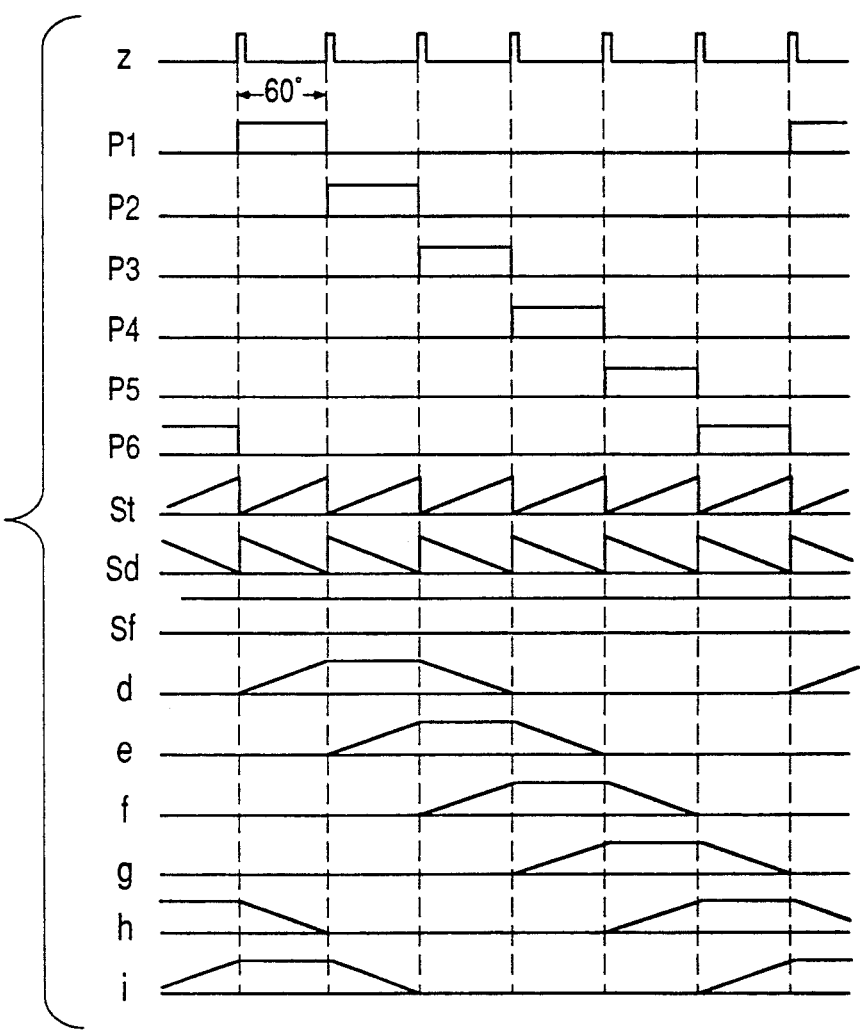
FIG. 14 is a diagram showing a signal waveform outputted from each member of the circuit shown in FIG. 13.

FIG. 13 is a circuit diagram of the trapezoidal waveform signal forming circuit 4 and FIG. 14 is a diagram showing a signal waveform outputted from each member of the circuit shown in FIG. 13.

In FIG. 13, the reference numeral 60 indicates an input terminal of the trapezoidal waveform signal forming circuit 4 to receive an output signal st from the slant waveform generating circuit; element 63 is a buffer amplifier having an input terminal connected to a reference power supplying circuit 62 for receiving a signals; element 61 is an inversion amplifier for receiving the output signal st from the input terminal 60 and the output signal sf from the buffer amplifier 63. Also, three signals comprising the signal st from the input terminal 60, the signals from the buffer amplifier 63 and an output signal sd from the inversion amplifier 61 are inputted to each of signal forming circuits 71, 72, 73, 74, 75 and 76. In addition, the signal forming circuits 71, 72, 73, 74, 75 and 76 all are equal in arrangement to each other and of which, only the arrangement of the signal forming circuit 71 is typically shown in FIG. 13. In the signal forming circuit 71, 64, 65 and 66 are switches and their one ends are connected to the input terminal 60, buffer amplifier 63 and inversion amplifier 61, respectively and their other ends are commonly connected to a resistor 67. A voltage signal obtained through the resistor 67 becomes an output signal from the signal forming circuit 71. In FIG. 13, the switches 64, 65 and 66 are switched ON of OFF in response to the three pulse signals (p1, p2, p3) out of the six-phase pulse signals p1, p2, p3, p4, p5 and p6 outputted from the logical pulse generating circuit 2. Then, from the output terminal of the signal forming circuit 71, a signal d is outputted. Similarly, three switches (not shown) of each of the signal forming circuits 72, 73, 74, 75 and 76 are switched ON or OFF in response to the three pulse signals (p2, p3, p4), (p3, p4, p5), (p4, p5, p6), (p5, p6, p1) and (p6, p1, p2), respectively. Then, the circuits 72, 73, 74, 75 and 76 respectively output signals e, f, g, h and i from their output terminals.

Next, the operation of the trapezoidal signal forming circuit 4 in FIG. 13 will be explained by referring to FIG. 14 in which a signal waveform outputted from each member thereof is shown.

In FIG. 14, z is an output signal from the period detecting circuit 6, p1, p2, p3, p4, p5 and p6 are output signals from the logical pulse generating circuit 2 and st is an output signal from the slant waveform generating circuit 3. Since the output signal st from the slant waveform generating circuit 3 is sent to the inversion amplifier 61, an output signal from the inversion amplifier 61 becomes a signal as shown at sd of FIG. 14, which is obtained by inverting the signal st, or (sd=sf−ft). FIG. 14 (sf) show a waveform of an output signal of the buffer amplifier 63, the magnitude of which is set such as to be equal to the peak value of the slant waveform signal st. The switches 64, 65 and 66 of the signal forming circuit 71 are switched ON by means of a signal of "H" and switched OFF by means of a signal of "L" in response to the pulse signals p1, p2 and p3 outputted from the logical pulse generating circuit 2, so that the outputs of the input terminal 60, the buffer amplifier 63 and the inversion amplifier 61 are connected to the output terminal of the signal forming circuit 71 in a successive manner, thus obtaining a trapezoidal waveform signal as shown at d of FIG. 14.

In the similar manner as above, the signal forming circuits 72, 73, 74, 75 and 76 respectively output from their output terminals trapezoidal waveform signals e, f, g, h and i in response to the pulse signals (p2, p3, p4), (p3, p4, p5), (p4, p5, p6), (p5, p6, p1) and (p6, p1, p2).

Next, the operation of a position signal forming circuit 5 shown in FIG. 1 will be explained below.

Figure 15:
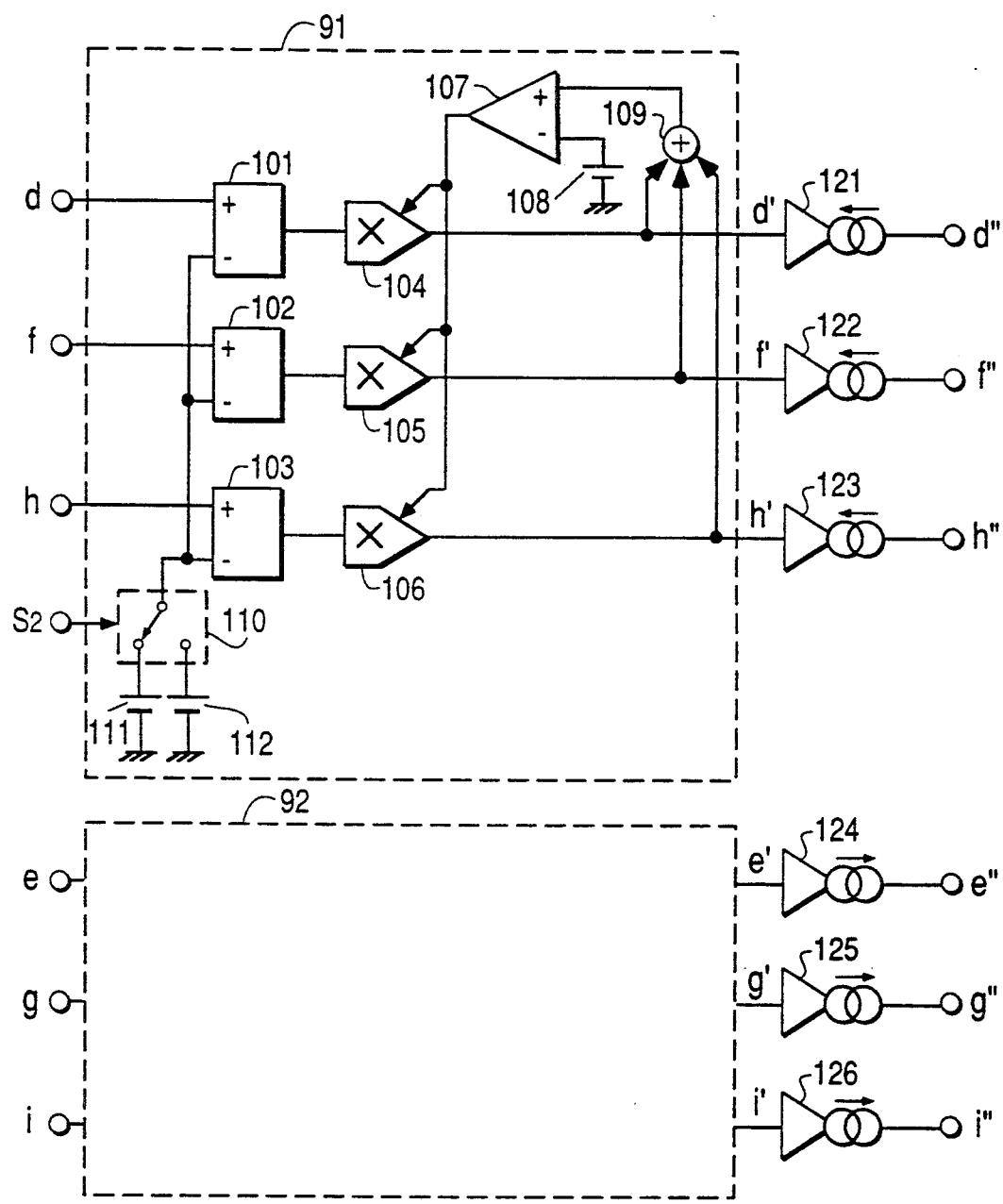
FIG. 15 is a circuit diagram of a position signal forming circuit as shown in FIG. 1.
Figure 16:
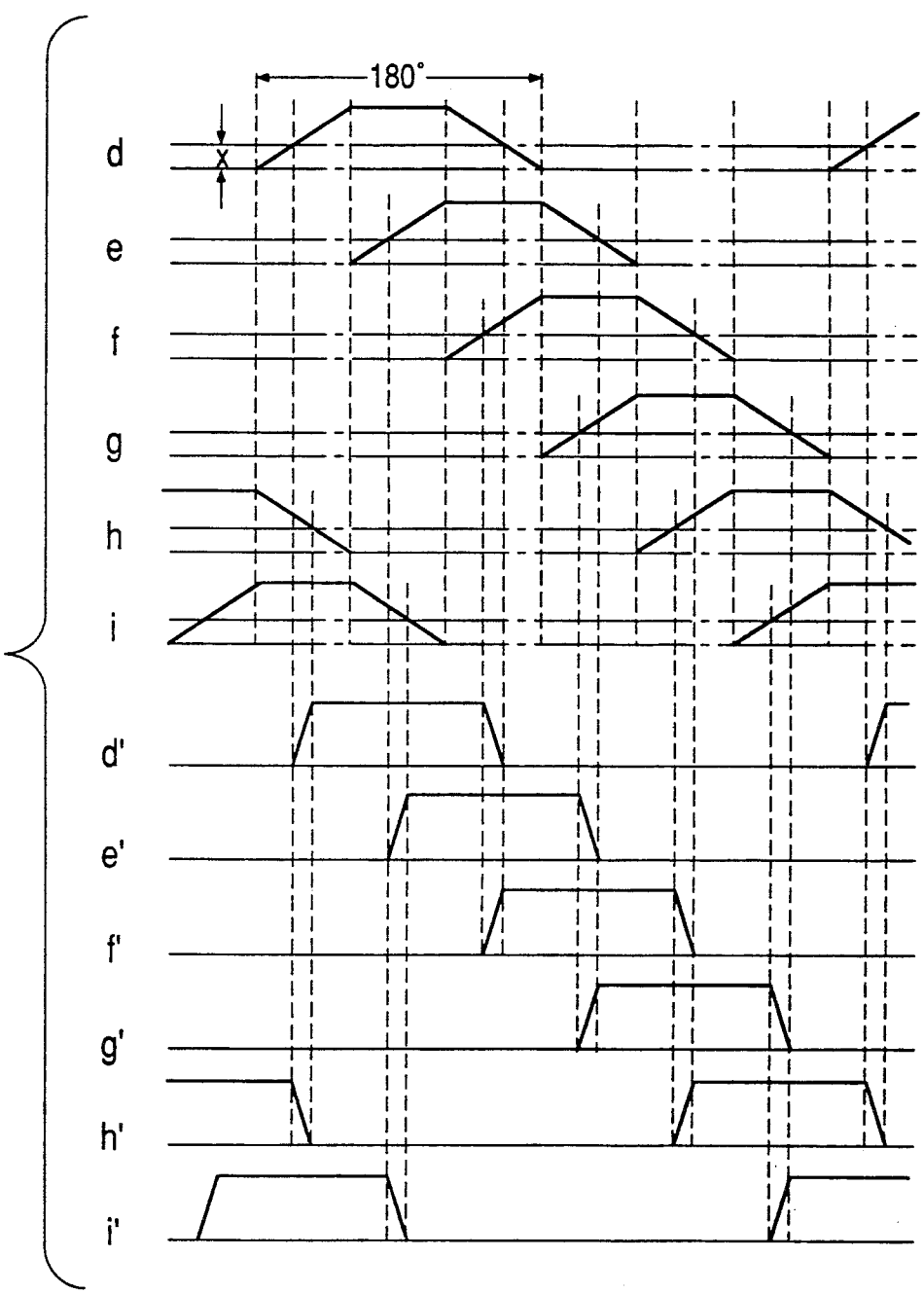
FIG. 16 is a diagram showing a signal waveform outputted form each member of the circuit shown in FIG. 15.

FIG. 15 is a circuit diagram of a position signal forming circuit 5 of this embodiment, and FIG. 16 is a diagram showing a signal waveform outputted from each member of the circuit 5.

In FIG. 15, the reference numerals 111 and 112 indicate reference voltage supplying circuits element 110 is a switch which is switched to the side of the switch 111 or the side of the switch 112 in response to an output signal s1 from the first D-flip-flop 45 or an output signal s2 from the second D-flip-flop 46 constituting the slant waveform generating circuit 3 as shown in FIG. 8. The reference numerals 101, 102 and 103 indicate subtracters respectively receiving trapezoidal waveform signals d, f and h formed through the trapezoidal waveform signal forming circuit 4. In addition the subtracters 101, 102 and 103 each receives through the switch 110 a constant DC value from the reference voltage supplying circuit 111 or 112. The reference numerals 104, 105 and 106 indicate multipliers receiving output signals from the subtracters 101, 102 and 103, respectively element 109 is an adder for receiving output, signals from the multipliers 104, 105 and 106; element 107 is an amplifier having one input terminal (+) which receives an output signal from the adder 109 and having another input terminal (−) receives a DC value from a reference voltage supplying circuit 108. An output signal from the amplifier 107 is sent to the multipliers 104, 105 and 106 as a gain control input signal so as to thereby control a gain of each of the multipliers 104, 105 and 106. Then, from the multipliers 104, 105 and 106 are outputted signals d', f' and h', respectively. The subtracters 101, 102, and 103, the multipliers 104, 105 and 106, the adder 109, the amplifier 107, the switch 110 and the reference voltage supplying circuits 108, 111 and 112 constitute an upper side position signal forming circuit 91 for forming a base signal to be supplied to the transistors 21, 22 and 23 shown in FIG. 2. Similarly, the trapezoidal waveform signals e, g and i formed through the trapezoidal waveform signal forming circuit 4 are convertibly formed through a lower side position signal forming circuit 92 into signals e', g' and i', respectively. In this case, however, the lower side position signal forming circuit 92 is equal in arrangement to the upper side position signal forming circuit 91, and only the arrangement of the upper side position signal forming circuit 91 is shown here. In FIG. 15, the reference numerals 121, 122, 123, 124, 125 and 126 indicate voltage current converting circuits, which convert the voltage signals d', f', h', e', g' and i' obtained through the upper side position signal forming circuit 91 and lower side position signal forming circuit 92 into current signals d", f", h", e", g" and i", respectively.

Next, the operation of the position signal forming circuit 5 shown in FIG. 15 when the permanent magnet rotor 27 is being rotated at a low speed will be first explained below by referring to FIG. 16 showing a signal waveform outputted from each member thereof. In this case, however, suppose that a signal s1 (or s2) inputted to the switch 110 when rotating at a low speed becomes "H" and is connected to the side of the reference voltage supplying circuit 111 (a DC value x).

In FIG. 16, d, e, f, g, h and i show six-phase trapezoidal waveform signals outputted from the trapezoidal waveform signal forming circuit 4, and a bottom width of each of these signals is 180° in terms of electric angle as seen in FIG. 16. In addition, a direct current (DC)

value x of the reference voltage supplying circuit 111 for each signal is shown by the alternate long and short dash line. That is, from the subtracters 101, 102 and 103, only signals made of the upper parts than the alternate long and short dash lines of the signals d, e, f, g, h and i are outputted. The multipliers 104, 105 and 106, the adder 109 and the amplifier 107 constitute a closed loop, in which the multipliers 104, 105 and 106 are controlled their gains so as to make an output from the adder 109 equal to the DC value of the reference voltage supplying circuit 108. As a result, input signals of the multipliers 104, 105 and 106 respectively from the adder 101, 102 and 103 become six-phase trapezoidal waveform signals equal in peak value to each other and having a bottom width smaller than 180° in terms of electric angle as shown at d', e', f', g', h' and i' of FIG. 16. Also, a bottom width of each trapezoidal waveform signal may be freely set between 180° (when x=0) and 120° in terms of electric angle by varying the magnitude of the DC value x of the reference voltage supplying circuit 111.

Next, when the rotor 27 is being rotated at a high speed, the signal s1 (or s2) inputted to the switch 110 becomes "L" and is connected to the side of the reference voltage supplying circuit 112 (a DC value x'), so that a bottom width of each position signal waveform can be made larger than that obtained when rotating at a low speed (x'<x). In addition, if the magnitude of the DC value x' of the reference voltage supplying circuit 112 is set to zero, the signals d', e', f', g' h' and i' are equal to the signals d, e, f, g, h and i, respectively, thus being possible to make the bottom width of each trapezoidal waveform signal of 180° in terms of electric angle.

Particularly when starting a motor, although sufficiently large counter electromotive forces are not induced in the stator windings of a rotor, an electric current larger than that when the motor is under the normal rotation is supplied to the stator windings, so that in order to detect zero-crossing points of the counter electromotive forces to be induced properly, it is required to make sure that the electric current becomes equal to zero in the vicinity of the zero-crossing point of each counter electromotive force. Accordingly, from the viewpoint of preventing the malfunction of the counter electromotive force detecting circuit 1 for detecting the zero-crossing point of a counter electromotive force induced therein, it is preferable to select a conducting width Dc shown in FIG. 3 as to be considerably smaller than 180° in terms of electric angle as well as to set the DC value x as to be large when starting. And when the rotation becomes normally, the DC value x may be set small.

The signals d', e', f', g', h' and i' shown in FIG. 16 become position signals of the permanent magnet rotor 27. These position signals d', e', f', g', h' and i' are voltage signals and respectively converted through the voltage-current converting circuits 121, 124, 122, 125, 123 and 126 into the current signals d", e", f", g", h" and i" in accordance with respective voltages to be inputted, and then, sent to the power supplying circuit 6 shown in FIG. 1.

As clearly seen from the above-mentioned explanations, in a brushless DC motor of this invention, a counter electromotive force detecting circuit 1 detects the zero-crossing points of counter electromotive forces a, b and c respectively induced the stator windings 11, 12 and 13 and converts them into a pulse signal n. Next, a period detecting circuit 7 measures a period of the pulse signal n, and when the period thus measured is within a specific range, outputs the pulse signal n, and when starting, outputs a pseudo pulse signal t as an output pulse signal z instead of the pulse signal z to a logical pulse generating circuit 2 and a slant waveform generating circuit 3. The logical pulse generating circuit 2 receives this pulse signal z to generate six-phase pulse signals p1, p2, p3, p4, p5 and p6. The slant waveform generating circuit 3 also receives the pulse signal z and generates a sawtooth waveform signal st equal in phase to the pulse signal z. The sawtooth waveform signal st and the six-phase signals p1, p2, p3, p4, p5 and p6 are sent to a trapezoidal waveform signal forming circuit 4 to convert them into the six-phase trapezoidal waveform signals d, e, f, g, h and i as shown in FIG. 14. These six-phase trapezoidal waveform signals d, e, f, g, h and i are sent to a position signal forming circuit 5 and respectively converted into trapezoidal waveform position signals d', e', f', g', h' and i' each smaller in bottom width then 180° in terms of electric angle. Finally, a power supplying circuit 6 supplies a driving current bidirectionally to the stator windings 11, 12 and 13 in a successive manner in response to these rotor position signals d', e', f', g', h' and i' as shown in FIGS. 3j, k and l, thus the permanent magnet rotors 27 being rotated. A notation Dc shown in FIG. 3 is a conducting width of each of the driving current signals j, k and l, which may be freely set by varying the direct current value of a reference voltage supplying circuit 111 or 112 of the position signal forming circuit 5 shown in FIG. 15.

Thus, a brushless DC motor of this invention makes it possible to flow an electric current bidirectionally to the stator windings based on the full wave driving method without equipping with a position sensor such as, for example, the Hall sensor.

In addition, if a conducting width of each of the driving current signals j, k, and l to be supplied to the stator windings 11, 12 and 13 is fixed to a value of 180° in terms of electric angle, the voltage signals from the trapezoidal waveform signal forming circuit 4 are converted through respective voltage-current converting circuits into current signals without a position signal forming circuit 5, and then the current signals thus converted may be sent directly to the power supplying circuit 6.

Further in addition, the counter electromotive force detecting circuit 1 concerning this invention uses, as shown in FIG. 4, three resistors commonly connected to each other in order to detect an electric potential of the neutral point o of stator windings. In this case, however, a signal line can be used by taking out directly from the neutral point of stator windings of a motor for this purpose. Still further in addition, in these embodiments of this invention described above, a motor to be used is limited to a three-phase motor having stator windings of a Y (star) connection, but it is not limited thereto, being capable of using motor having stator windings of a (delta) connection.

Also, in this embodiment of a slant waveform generating circuit 3 of this invention, a period detecting circuit 6 measures a period of the pulse signal n outputted from a counter electromotive force detecting circuit 1 and a slant angle on a time basis of a slant waveform is changed over by three steps in response to the period thus measured, but it is not limited thereto and can be increased to more than three as well as varied continuously.

What is claimed is:

1. A brushless DC motor comprising:
   a plurality of stator windings;
   a counter electromotive force detecting circuit for generating a pulse signal train in response t counter electromotive forces respectively induced in said plurality of stator windings;
   a logical pulse generating circuit for generating multi-phase pulse signals in response to said pulse signal train;
   a slant waveform signal generating circuit for generating a slant waveform signal in response to said pulse signal train;
   a trapezoidal waveform signal forming circuit for forming trapezoidal waveform signals from the multi-phase pulse signals outputted from said logical pulse generating circuit and the slant waveform signal outputted from said slant waveform signal generating circuit; and
   a power supplying circuit for receiving the trapezoidal waveform signals from said trapezoidal waveform signal generating circuit as position signals of the rotor and for supplying electrical power to said plurality of stator windings in response to said position signal.

2. A brushless DC motor as claimed in claim 1, wherein said slant waveform signal generating circuit changes slant angle on time basis in response to the period of the pulse signal train outputted from said counter electromotive force detecting circuit.

3. A brushless DC motor as claimed in claim 1, wherein said slant waveform signal generating circuit comprises a counter circuit for counting a clock signal and a digital/analog converter circuit for converting said counted signal of said counter circuit into an analog value.

4. A brushless DC motor as claimed in claim 3, wherein said slant waveform signal generating circuit changes the clock signal inputted to said counter circuit in response to the period of the pulse signal train outputted from said counter electromotive force detecting circuit.

5. A brushless DC motor comprising:
   a plurality of stator windings;
   a counter electromotive force detecting circuit for generating a pulse signal train in response to counter electromotive forces respectively induced in said plurality of stator windings;
   a period detecting circuit for outputting said pulse signal train when the period of said pulse signal train is within a predetermined range and for outputting a pseudo output pulse signal when the period of said pulse signal train exceeds the predetermined range;
   a logical pulse generating circuit for generating multi-phase pulse signals in response to one output signal from said period detecting circuit;
   a slant waveform signal generating circuit for generating a slant waveform signal in response to said one output signal from said period detecting circuit;
   a trapezoidal waveform signal forming circuit for forming trapezoidal waveform signals from the multi-phase pulse signals outputted from said logical pulse generating circuit and the slant waveform signal outputted from said slant waveform signal generating circuit; and a power supplying circuit for receiving said trapezoidal waveform signals from said trapezoidal waveform signal forming circuit as position signals of the rotor and for supplying electric power to said plurality of stator windings in response to said position signals.

6. A brushless DC motor as claimed in claim 5, wherein said slant waveform signal generating circuit changes slant angle on time basis in response to the period of the pulse signal train outputted from said period detecting circuit.

7. A brushless DC motor as claimed in claim 5, wherein said slant waveform signal generating circuit comprises a counter circuit for counting a clock signal and a digital/analog converter circuit for converting said counted signal of said counter circuit into an analog value.

8. A brushless DC motor as claimed in claim 7, wherein said slant waveform signal generating circuit changes the clock signal to be inputted to said counter circuit in response to the period of the pulse signal train outputted from said period detecting circuit.

9. A brushless DC motor comprising:
   a plurality of stator windings;
   a counter electromotive force detecting circuit for generating a pulse signal train in response to counter electromotive force respectively induced in said plurality of stator windings;
   a logical pulse generating circuit for generating multi-phase signals in response to said pulse signal train;
   a slant waveform signal generating circuit for generating a slant waveform signal in response to said pulse signal train;
   a trapezoidal waveform signal forming circuit for forming trapezoidal waveform signals from the multi-phase signals outputted from said logical pulse generating circuit and the slant waveform signal outputted from said slant waveform signal generating circuit;
   a position signal forming circuit for forming position signals of the rotor by subtracting a direct current value from the trapezoidal waveform signal outputted from said trapezoidal waveform signal forming circuit; and
   a power supplying circuit for supplying electric power to said plurality of stator windings in response to said position signals.

10. A brushless DC motor as claimed in claim 9, wherein said slant waveform signal generating circuit changes slant angle on a time basis in response to the period of the pulse signal train outputted from said counter electromotive force detecting circuit.

11. A brushless DC motor as claimed in claim 9, wherein said slant waveform signal generating circuit comprises a counter circuit for counting a clock signal, and a digital/analog converter circuit for converting said counted signal of said counter circuit into an analog value.

12. A brushless DC motor as claimed in claim 11, wherein said slant waveform signal generating circuit changes the clock signal inputted to said counter circuit in response to the period of the pulse signal train outputted from said counter electromotive force detecting circuit.

13. A brushless DC motor as claimed in claim 9, wherein said position signal forming circuit comprises a plurality of subtracter circuits each for subtracting the direct current value from the trapezoidal waveform signal inputted thereto, a plurality of multiplier circuits each for converting the subtracted signal from each of said plurality of subtracter circuits into an output signal, an adder circuit for adding said output signals from said plurality of multiplier circuits, and an amplifier circuit for controlling said output signals from said plurality of multiplier circuits so as to make a value obtained by said adder circuit equal to a predetermined value.

14. A brushless DC motor as claimed in claim 9, wherein said position signal forming circuit changes the direct current value to be subtracted from the trapezoidal waveform signal outputted from said trapezoidal waveform signal generating circuit in response to the period of the pulse signal train outputted from said counter electromotive force detecting circuit.

15. A brushless DC motor as claimed in claim 9, wherein said position signal forming circuit increase the direct current value subtracted from the trapezoidal waveform signal outputted from said trapezoidal waveform signal generating circuit when the period of the pulse signal train outputted from said counter electromotive force detecting circuit is long.

16. A brushless DC motor comprising:
a plurality of stator windings;
a counter electromotive force detecting circuit for generating a pulse signal train in response to counter electromotive forces respectively induced in said plurality of stator windings.
a period detecting circuit for outputting said pulse signal train as an output signal when the period of said pulse signal train is within a predetermined range and for outputting a pseudo output pulse signal as the output signal when the period of said pulse signal train exceeds the predetermined range;
a logical pulse generating circuit for generating multi-phase pulse signals in response to the output signal from said period detecting circuit;
a slant waveform signal generating circuit for receiving said output signal from said period detecting circuit and for generating a slant waveform signal in response to the output signal thus received;
a trapezoidal waveform signal forming circuit for forming trapezoidal waveform signals from said multi-phase pulse signals outputted from said logical pulse generating circuit and said slant waveform signal outputted from said slant waveform signal generating circuit;
a position signal forming circuit for forming position signals by subtracting a direct current value from the trapezoidal waveform signal outputted from said trapezoidal waveform signal forming circuit; and a power supplying circuit for supplying electric power to said plurality of stator windings in response to said position signals.

17. A brushless DC motor as claimed in claim 16, wherein said slant waveform signal generating circuit changes slant angle on a time basis in response to the period of the pulse signal train outputted from said period detecting circuit.

18. A brushless DC motor as claimed in claim 16, wherein said slant waveform signal generating circuit comprises a counter circuit for counting a clock signal and a digital/analog converter circuit for converting said counted signal of said counter circuit into an analog value.

19. A brushless DC motor as claimed in claim 18, wherein said slant waveform signal generating circuit changes the clock signal inputted to said counter circuit in response to the period of the pulse signal train outputted from said period detecting circuit.

20. A brushless DC motor as claimed in claim 16, wherein said position signal forming circuit comprises a plurality of subtracter circuits each for subtracting the direct current value from the trapezoidal waveform signal inputted thereto, a plurality of multiplier circuits each for converting the subtracted signal from each of said plurality of subtracter circuits into an output signal, an adder circuit for adding said output signals from said plurality of multiplier circuits, and an amplifier circuit for controlling said output signals from said plurality of multiplier circuits so as to make a value obtained by said adder circuit equal to a predetermined value.

21. A brushless DC motor as claimed in claim 16, wherein said position signal forming circuit changes the direct current value subtracted from the trapezoidal waveform signal outputted from said trapezoidal waveform signal forming circuit in response to the period of the pulse signal train outputted from said period detecting circuit.

22. A brushless DC motor as claimed in claim 16, wherein said position signal forming circuit increases the direct current value subtracted from the trapezoidal waveform signal outputted from said trapezoidal waveform signal forming circuit when the period of the pulse signal train outputted from said period detecting circuit is long.

* * * * *